United States Patent
Lin et al.

(10) Patent No.: US 10,291,131 B2
(45) Date of Patent: *May 14, 2019

(54) SYSTEMS AND METHODS FOR PEAK CURRENT ADJUSTMENTS IN POWER CONVERSION SYSTEMS

(71) Applicant: ON-BRIGHT ELECTRONICS (SHANGHAI) CO., LTD., Shanghai (CN)

(72) Inventors: Yuan Lin, Shanghai (CN); Weihua Wang, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,002

(22) Filed: Apr. 13, 2016

(65) Prior Publication Data

US 2016/0329818 A1    Nov. 10, 2016

Related U.S. Application Data

(63) Continuation of application No. 13/722,788, filed on Dec. 20, 2012, now Pat. No. 9,379,624.

(30) Foreign Application Priority Data

Dec. 10, 2012 (CN) .......................... 2012 1 0529679

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33523* (2013.01);
(Continued)

(58) Field of Classification Search
CPC ......... H02M 3/33507; H02M 3/33523; H02M 2001/0032; H02M 3/33569; H02M 1/08;
(Continued)

(56) References Cited

U.S. PATENT DOCUMENTS 3,912,340 A    10/1975    Bertolasi
5,247,241 A    9/1993    Ueda
(Continued)

FOREIGN PATENT DOCUMENTS

CN    1841893 A    10/2006
CN    1917322 A    2/2007
(Continued)

OTHER PUBLICATIONS

Chinese Patent Office, Office Action dated Dec. 8, 2014, in Application No. 201110034669.9.
(Continued)

*Primary Examiner* — Nguyen Tran
*Assistant Examiner* — Monica Mata
(74) *Attorney, Agent, or Firm* — Faegre Baker Daniels LLP

(57) ABSTRACT

System and method for regulating an output of a power conversion system. An example system controller includes a signal generator and a modulation and drive component. The signal generator is configured to receive at least a first signal indicating a magnitude of an input voltage received by a primary winding of a power conversion system and receive a second signal indicating a magnitude of a primary current flowing through the primary winding, and generate a third signal. The modulation and drive component is configured to receive at least the third signal, generate a drive signal based on at least information associated with the third signal, and output the drive signal to a switch to affect the primary current.

63 Claims, 11 Drawing Sheets

(52) U.S. Cl.
CPC .............. *H02M 2001/0009* (2013.01); *H02M 2001/0022* (2013.01); *H02M 2001/0032* (2013.01); *Y02B 70/16* (2013.01)

(58) Field of Classification Search
CPC ....... H02M 3/33515; H02M 2001/0009–0032; Y02B 70/16
See application file for complete search history.

(56) References Cited

U.S. PATENT DOCUMENTS

| | | | |
|---|---|---|---|
| 5,497,119 | A | 3/1996 | Tedrow et al. |
| 5,568,044 | A | 10/1996 | Bittner |
| 5,729,448 | A | 3/1998 | Haynie et al. |
| 6,134,060 | A | 10/2000 | Ryat |
| 6,292,376 | B1 | 9/2001 | Kato |
| 6,366,066 | B1 | 4/2002 | Wilcox |
| 6,366,070 | B1 | 4/2002 | Cooke et al. |
| 6,381,151 | B1 | 4/2002 | Jang |
| 6,545,513 | B2 | 4/2003 | Tsuchida et al. |
| 6,556,478 | B2 | 4/2003 | Willis et al. |
| 6,713,995 | B2 | 3/2004 | Chen |
| 6,798,086 | B2 | 9/2004 | Utsunomiya |
| 6,947,298 | B2 | 9/2005 | Uchida |
| 6,954,056 | B2 | 10/2005 | Hoshino et al. |
| 6,972,528 | B2 | 12/2005 | Shao |
| 6,972,548 | B2 | 12/2005 | Tzeng et al. |
| 6,977,824 | B1 | 12/2005 | Yang et al. |
| 7,035,119 | B2 | 4/2006 | Koike |
| 7,054,169 | B2 | 5/2006 | Huh et al. |
| 7,116,089 | B1 | 10/2006 | Nguyen et al. |
| 7,173,404 | B2 | 2/2007 | Wu |
| 7,208,927 | B1 | 4/2007 | Nguyen |
| 7,262,587 | B2 | 8/2007 | Takimoto et al. |
| 7,265,999 | B2 | 9/2007 | Murata et al. |
| 7,345,895 | B2 | 3/2008 | Zhu et al. |
| 7,394,634 | B2 | 7/2008 | Fang et al. |
| 7,414,865 | B2 | 8/2008 | Yang |
| 7,456,623 | B2 | 11/2008 | Hasegawa et al. |
| 7,492,619 | B2 | 2/2009 | Ye et al. |
| 7,522,431 | B2 | 4/2009 | Huynh et al. |
| 7,605,576 | B2 | 10/2009 | Kanakubo |
| 7,609,039 | B2 | 10/2009 | Hasegawa |
| 7,684,220 | B2 | 3/2010 | Fang et al. |
| 7,684,462 | B2 | 3/2010 | Ye et al. |
| 7,826,237 | B2 | 11/2010 | Zhang et al. |
| 7,852,055 | B2 | 12/2010 | Michishita |
| 7,898,825 | B2 | 3/2011 | Mulligan et al. |
| 7,990,202 | B2 | 8/2011 | Fang et al. |
| 8,085,027 | B2 | 12/2011 | Lin et al. |
| 8,213,203 | B2 | 7/2012 | Fei et al. |
| 8,305,776 | B2 | 11/2012 | Fang |
| 8,331,112 | B2 | 12/2012 | Huang et al. |
| 8,339,814 | B2 | 12/2012 | Zhang et al. |
| 8,391,028 | B2 | 3/2013 | Yeh |
| 8,488,342 | B2 | 7/2013 | Zhang et al. |
| 8,526,203 | B2 | 9/2013 | Huang et al. |
| 8,879,289 | B2 | 11/2014 | Lin et al. |
| 8,891,256 | B2 | 11/2014 | Fang et al. |
| 8,971,062 | B2 | 3/2015 | Huang et al. |
| 8,982,585 | B2 | 3/2015 | Fang |
| 9,088,217 | B2 | 7/2015 | Zhang et al. |
| 9,325,234 | B2 | 4/2016 | Zhang et al. |
| 9,350,252 | B2 | 5/2016 | Zhang et al. |
| 9,379,623 | B2 | 6/2016 | Zhang et al. |
| 9,379,624 | B2 | 6/2016 | Lin et al. |
| 9,385,612 | B2 | 7/2016 | Zhang et al. |
| 9,559,598 | B2 | 1/2017 | Fang et al. |
| 9,577,537 | B2 | 2/2017 | Zhang et al. |
| 9,584,025 | B2 | 2/2017 | Lin et al. |
| 9,871,451 | B2 | 1/2018 | Lin et al. |
| 9,906,144 | B2 | 2/2018 | Zhang et al. |
| 9,929,655 | B2 | 3/2018 | Fang et al. |
| 10,003,271 | B2 | 6/2018 | Fang et al. |
| 10,008,939 | B2 | 6/2018 | Zhang et al. |
| 10,069,424 | B2 | 9/2018 | Lin et al. |
| 2002/0080625 | A1 | 6/2002 | Goyhenetche et al. |
| 2002/0080631 | A1 | 6/2002 | Kanouda et al. |
| 2003/0174520 | A1 | 9/2003 | Bimbaud |
| 2004/0075600 | A1 | 4/2004 | Vera et al. |
| 2005/0057238 | A1 | 3/2005 | Yoshida |
| 2005/0116697 | A1 | 6/2005 | Matsuo et al. |
| 2005/0222646 | A1 | 10/2005 | Kroll et al. |
| 2005/0270807 | A1 | 12/2005 | Strijker |
| 2006/0034102 | A1 | 2/2006 | Yang et al. |
| 2006/0043953 | A1 | 3/2006 | Xu |
| 2006/0050539 | A1 | 3/2006 | Yang et al. |
| 2006/0055433 | A1 | 3/2006 | Yang et al. |
| 2006/0273772 | A1 | 12/2006 | Groom |
| 2007/0115696 | A1 | 5/2007 | Berghegger |
| 2007/0171687 | A1 | 7/2007 | Kogel et al. |
| 2007/0241733 | A1 | 10/2007 | Chen et al. |
| 2007/0273345 | A1 | 11/2007 | Chen et al. |
| 2008/0061754 | A1 | 3/2008 | Hibi |
| 2008/0112193 | A1 | 5/2008 | Yan et al. |
| 2008/0157742 | A1 | 7/2008 | Martin et al. |
| 2008/0159378 | A1 | 7/2008 | Kris |
| 2008/0225563 | A1 | 9/2008 | Seo |
| 2008/0252345 | A1 | 10/2008 | Deschamp et al. |
| 2009/0051336 | A1 | 2/2009 | Hartlieb et al. |
| 2009/0058387 | A1 | 3/2009 | Huynh et al. |
| 2009/0073727 | A1 | 3/2009 | Huynh et al. |
| 2009/0121697 | A1 | 5/2009 | Aiura et al. |
| 2009/0141520 | A1 | 6/2009 | Grande et al. |
| 2009/0175057 | A1 | 7/2009 | Grande et al. |
| 2009/0206814 | A1 | 8/2009 | Zhang et al. |
| 2009/0219000 | A1 | 9/2009 | Yang |
| 2009/0251219 | A1 | 10/2009 | Fiocchi et al. |
| 2009/0302817 | A1 | 12/2009 | Nagai |
| 2010/0026270 | A1 | 2/2010 | Yang et al. |
| 2010/0027300 | A1 | 2/2010 | Fang |
| 2010/0061126 | A1 | 3/2010 | Huynh et al. |
| 2010/0128501 | A1 | 5/2010 | Huang et al. |
| 2010/0141178 | A1 | 6/2010 | Negrete et al. |
| 2010/0219802 | A1 | 9/2010 | Lin et al. |
| 2010/0225293 | A1 | 9/2010 | Wang et al. |
| 2011/0044076 | A1 | 2/2011 | Zhang et al. |
| 2011/0096574 | A1 | 4/2011 | Huang |
| 2011/0149614 | A1 | 6/2011 | Stracquadaini |
| 2011/0182089 | A1 | 7/2011 | genannt Berghegger |
| 2011/0248770 | A1 | 10/2011 | Fang et al. |
| 2011/0267853 | A1 | 11/2011 | Yang et al. |
| 2012/0013321 | A1 | 1/2012 | Huang et al. |
| 2012/0075891 | A1 | 3/2012 | Zhang et al. |
| 2012/0139435 | A1 | 6/2012 | Storm |
| 2012/0147630 | A1 | 6/2012 | Cao et al. |
| 2012/0153919 | A1 | 6/2012 | Garbossa et al. |
| 2012/0195076 | A1 | 8/2012 | Zhang et al. |
| 2012/0224397 | A1 | 9/2012 | Yeh |
| 2012/0257423 | A1 | 10/2012 | Fang |
| 2012/0281438 | A1 | 11/2012 | Fang et al. |
| 2012/0300508 | A1 | 11/2012 | Fang |
| 2012/0320640 | A1 | 12/2012 | Baurle et al. |
| 2013/0027989 | A1 | 1/2013 | Fang |
| 2013/0033905 | A1 | 2/2013 | Lin et al. |
| 2013/0051090 | A1 | 2/2013 | Xie et al. |
| 2013/0182476 | A1 | 7/2013 | Yang et al. |
| 2013/0223107 | A1 | 8/2013 | Zhang et al. |
| 2013/0272033 | A1 | 10/2013 | Zhang et al. |
| 2013/0308350 | A1 | 11/2013 | Huang et al. |
| 2014/0078790 | A1 | 3/2014 | Lin et al. |
| 2014/0160809 | A1 | 6/2014 | Lin et al. |
| 2014/0268920 | A1 | 9/2014 | Fang et al. |
| 2015/0055378 | A1 | 2/2015 | Lin et al. |
| 2015/0162820 | A1 | 6/2015 | Zhang et al. |
| 2015/0180347 | A1 | 6/2015 | Fang et al. |
| 2015/0295499 | A1 | 10/2015 | Zhang et al. |
| 2015/0311804 | A1 | 10/2015 | Fang |
| 2016/0028318 | A1 | 1/2016 | Fang et al. |
| 2016/0218631 | A1 | 7/2016 | Zhang et al. |
| 2016/0315543 | A1 | 10/2016 | Zhang et al. |
| 2016/0329821 | A1 | 11/2016 | Zhang et al. |
| 2016/0354792 | A1 | 12/2016 | Zhang et al. |
| 2017/0187293 | A1 | 6/2017 | Fang et al. |

(56) References Cited

U.S. PATENT DOCUMENTS

| | | | |
|---|---|---|---|
| 2018/0109195 A1 | 4/2018 | Lin et al. | |
| 2018/0109196 A1 | 4/2018 | Lin et al. | |
| 2018/0131284 A1 | 5/2018 | Fang et al. | |

FOREIGN PATENT DOCUMENTS

| | | | |
|---|---|---|---|
| CN | 1929274 A | 3/2007 | |
| CN | 1964172 A | 5/2007 | |
| CN | 1988347 A | 6/2007 | |
| CN | 101034851 A | 9/2007 | |
| CN | 101039077 A | 9/2007 | |
| CN | 101079576 A | 11/2007 | |
| CN | 101127495 A | 2/2008 | |
| CN | 101247083 A | 8/2008 | |
| CN | 101295872 A | 10/2008 | |
| CN | 101350562 A | 1/2009 | |
| CN | 101515756 A | 8/2009 | |
| CN | 101552560 A | 10/2009 | |
| CN | 101577468 A | 11/2009 | |
| CN | 101577488 A | 11/2009 | |
| CN | 101826796 A | 9/2010 | |
| CN | 101515756 B | 11/2011 | |
| CN | 102332826 A | 1/2012 | |
| CN | 102474964 A | 5/2012 | |
| CN | 102624237 A | 8/2012 | |
| CN | 102651613 A | 8/2012 | |
| CN | 102709880 A | 10/2012 | |
| CN | 102723945 A | 10/2012 | |
| CN | 102983760 A | 3/2013 | |
| CN | 103166198 A | 6/2013 | |
| CN | 103296904 A | 9/2013 | |
| TW | 200840174 A | 10/2008 | |
| TW | 200937157 A | 9/2009 | |
| TW | I 437808 | 5/2014 | |
| TW | I 448060 | 8/2014 | |

OTHER PUBLICATIONS

Chinese Patent Office, Office Action dated Jun. 4, 2014, in Application No. 201110144768.2.
Chinese Patent Office, Office Action dated Nov. 12, 2013, in Application No. 201110051423.2.
Chinese Patent Office, Office Action dated Nov. 14, 2013, in Application No. 201110224933.5.
Chinese Patent Office, Office Action dated Nov. 5, 2013, in Application No. 201210529679.4.
Chinese Patent Office, Office Action dated Dec. 4, 2015, in Application No. 201410226277.6.
Chinese Patent Office, Office Action dated Nov. 5, 2013, in Application No. 201310078547.9.
Chinese Patent Office, Office Action dated Nov. 25, 2015, in Application No. 201310656906.4.
Chinese Patent Office, Office Action dated Nov. 7, 2013, in Application No. 201210342097.5.
Taiwan Patent Office, Office Action dated Mar. 3, 2014, in Application No. 100127088.
Taiwan Patent Office, Office Action dated May 6, 2015, in Application No. 102116550.
Taiwan Patent Office, Office Action dated Oct. 1, 2014, in Application No. 102116551.
Taiwan Patent Office, Office Action dated Oct. 16, 2015, in Application No. 102116550.
Taiwan Patent Office, Office Action dated Oct. 6, 2014, in Application No. 102115002.
United States Patent and Trademark Office, Notice of Allowance dated Aug. 7, 2015, in U.S. Appl. No. 14/151,209.
United States Patent and Trademark Office, Notice of Allowance dated Nov. 16, 2015, in U.S. Appl. No. 14/151,209.
United States Patent and Trademark Office, Notice of Allowance dated Jan. 20, 2015, in U.S. Appl. No. 12/859,138.
United States Patent and Trademark Office, Notice of Allowance dated Jul. 30, 2014, in U.S. Appl. No. 12/859,138.
United States Patent and Trademark Office, Notice of Allowance dated Jun. 22, 2015, in U.S. Appl. No. 13/052,869.
United States Patent and Trademark Office, Notice of Allowance dated Oct. 2, 2015, in U.S. Appl. No. 13/052,869.
United States Patent and Trademark Office, Notice of Allowance dated Jan. 8, 2016, in U.S. Appl. No. 13/052,869.
United States Patent and Trademark Office, Corrected Notice of Allowability dated May 26, 2016, in U.S. Appl. No. 13/052,869.
United States Patent and Trademark Office, Notice of Allowance dated Oct. 2, 2015, in U.S. Appl. No. 13/722,788.
United States Patent and Trademark Office, Notice of Allowance dated Feb. 1, 2016, in U.S. Appl. No. 13/722,788.
United States Patent and Trademark Office, Notice of Allowance dated Oct. 5, 2015, in U.S. Appl. No. 13/915,477.
United States Patent and Trademark Office, Notice of Allowance dated Feb. 22, 2016, in U.S. Appl. No. 13/915,477.
United States Patent and Trademark Office, Notice of Allowance dated Sep. 30, 2015, in U.S. Appl. No. 13/857,836.
United States Patent and Trademark Office, Office Action dated Apr. 1, 2014, in U.S. Appl. No. 13/052,869.
United States Patent and Trademark Office, Office Action dated Aug. 20, 2015, in U.S. Appl. No. 13/646,268.
United States Patent and Trademark Office, Office Action dated May 17, 2016, in U.S. Appl. No. 13/646,268.
United States Patent and Trademark Office, Office Action dated Dec. 5, 2012, in U.S. Appl. No. 12/859,138.
United States Patent and Trademark Office, Office Action dated Feb. 15, 2013, in U.S. Appl. No. 13/052,869.
United States Patent and Trademark Office, Office Action dated Feb. 24, 2015, in U.S. Appl. No. 13/722,788.
United States Patent and Trademark Office, Office Action dated Jul. 31, 2013, in U.S. Appl. No. 12/859,138.
United States Patent and Trademark Office, Office Action dated Mar. 12, 2015, in U.S. Appl. No. 13/857,836.
United States Patent and Trademark Office, Notice of Allowance dated Feb. 10, 2016, in U.S. Appl. No. 13/857,836.
United States Patent and Trademark Office, Office Action dated Mar. 12, 2015, in U.S. Appl. No. 13/915,477.
United States Patent and Trademark Office, Office Action dated Nov. 5, 2014, in U.S. Appl. No. 13/052,869.
United States Patent and Trademark Office, Office Action dated Oct. 1, 2013, in U.S. Appl. No. 13/052,869.
United States Patent and Trademark Office, Office Action dated Mar. 7, 2016, in U.S. Appl. No. 14/293,280.
United States Patent and Trademark Office, Notice of Allowance dated Apr. 21, 2016, in U.S. Appl. No. 14/684,047.
United States Patent and Trademark Office, Office Action dated Apr. 20, 2016, in U.S. Appl. No. 14/488,176.
United States Patent and Trademark Office, Office Action dated Nov. 22, 2016, in U.S. Appl. No. 13/646,268.
United States Patent and Trademark Office, Notice of Allowance dated Sep. 22, 2016, in U.S. Appl. No. 14/293,280.
United States Patent and Trademark Office, Notice of Allowance dated Oct. 21, 2016, in U.S. Appl. No. 14/684,047.
United States Patent and Trademark Office, Notice of Allowance dated Oct. 13, 2016, in U.S. Appl. No. 14/488,176.
United States Patent and Trademark Office, Office Action dated Nov. 2, 2016, in U.S. Appl. No. 14/824,018.
United States Patent and Trademark Office, Office Action dated Dec. 29, 2016, in U.S. Appl. No. 15/040,674.
United States Patent and Trademark Office, Office Action dated Mar. 7, 2017, in U.S. Appl. No. 15/099,419.
United States Patent and Trademark Office, Notice of Allowance dated Jul. 26, 2017, in U.S. Appl. No. 13/646,268.
United States Patent and Trademark Office, Office Action dated Jun. 30, 2017, in U.S. Appl. No. 14/824,018.
United States Patent and Trademark Office, Notice of Allowance dated Jul. 5, 2017, in U.S. Appl. No. 15/040,674.
United States Patent and Trademark Office, Office Action dated May 26, 2017, in U.S. Appl. No. 15/081,523.

(56) References Cited

OTHER PUBLICATIONS

United States Patent and Trademark Office, Office Action dated Mar. 22, 2017, in U.S. Appl. No. 15/152,362.
United States Patent and Trademark Office, Office Action dated Mar. 30, 2017, in U.S. Appl. No. 15/376,290.
United States Patent and Trademark Office, Notice of Allowance dated Nov. 14, 2017, in U.S. Appl. No. 14/824,018.
United States Patent and Trademark Office, Notice of Allowance dated Jan. 18, 2018, in U.S. Appl. No. 14/824,018.
United States Patent and Trademark Office, Notice of Allowance dated Dec. 1, 2017, in U.S. Appl. No. 15/081,523.
United States Patent and Trademark Office, Office Action dated Dec. 18, 2017, in U.S. Appl. No. 15/152,362.
United States Patent and Trademark Office, Notice of Allowance dated Nov. 17, 2017, in U.S. Appl. No. 15/376,290.
United States Patent and Trademark Office, Notice of Allowance dated Sep. 19, 2017, in U.S. Appl. No. 13/646,268.
United States Patent and Trademark Office, Notice of Allowance dated Sep. 11, 2017, in U.S. Appl. No. 15/040,674.
United States Patent and Trademark Office, Office Action dated Oct. 4, 2017, in U.S. Appl. No. 15/099,419.
United States Patent and Trademark Office, Office Action dated Aug. 8, 2017, in U.S. Appl. No. 15/376,290.
United States Patent and Trademark Office, Notice of Allowance dated Feb. 23, 2018, in U.S. Appl. No. 15/081,523.
United States Patent and Trademark Office, Notice of Allowance dated Jun. 25, 2018, in U.S. Appl. No. 15/081,523.
United States Patent and Trademark Office, Notice of Allowance dated Jul. 6, 2018, in U.S. Appl. No. 15/152,362.
United States Patent and Trademark Office, Office Action dated Mar. 20, 2018, in U.S. Appl. No. 15/835,344.
United States Patent and Trademark Office, Office Action dated Mar. 20, 2018, in U.S. Appl. No. 15/849,438.
United States Patent and Trademark Office, Notice of Allowance dated Sep. 20, 2018, in U.S. Appl. No. 15/849,438.
United States Patent and Trademark Office, Notice of Allowance dated Oct. 19, 2018, in U.S. Appl. No. 15/081,523.
United States Patent and Trademark Office, Notice of Allowance dated Dec. 5, 2018, in U.S. Appl. No. 15/152,362.
United States Patent and Trademark Office, Notice of Allowance dated Nov. 27, 2018, in U.S. Appl. No. 15/835,344.
United States Patent and Trademark Office, Office Action dated Nov. 19, 2018, in U.S. Appl. No. 16/014,685.

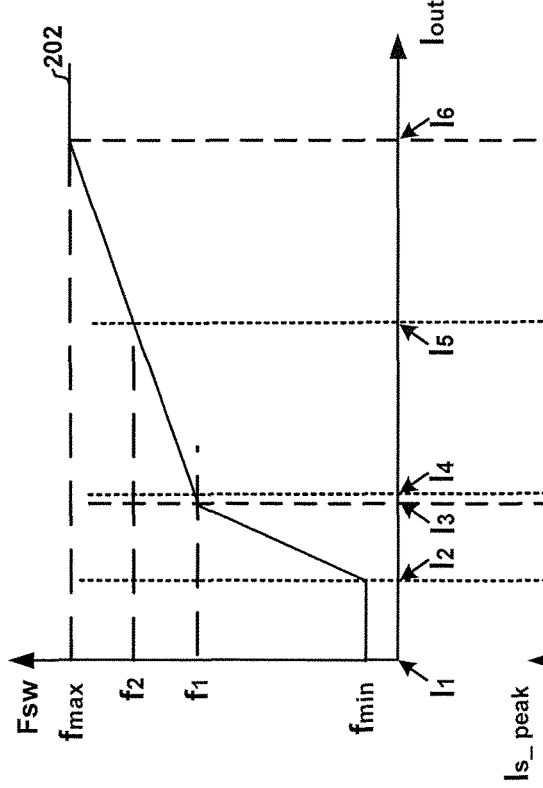
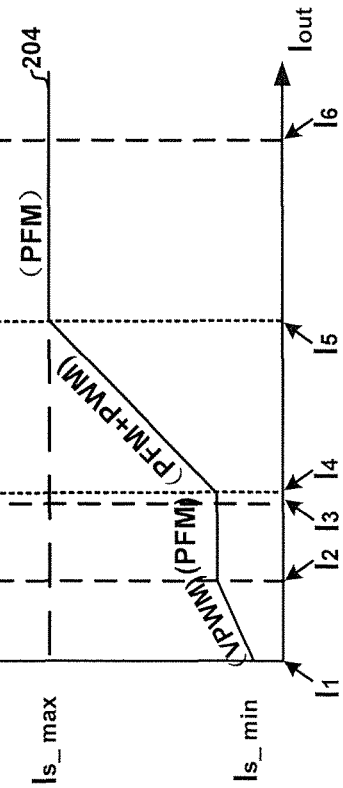
Figure 2(a)
Figure 2(b)

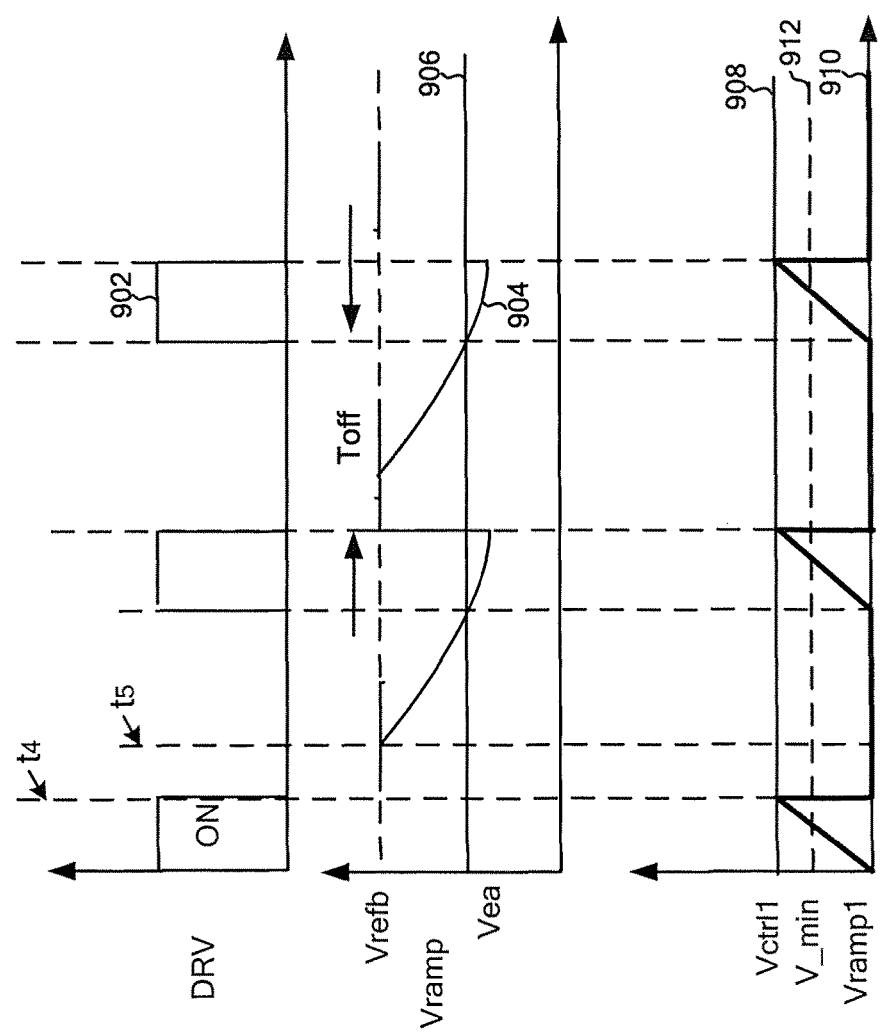

SYSTEMS AND METHODS FOR PEAK CURRENT ADJUSTMENTS IN POWER CONVERSION SYSTEMS

1. CROSS-REFERENCES TO RELATED APPLICATIONS

This application is a continuation of U.S. patent application Ser. No. 13/722,788, filed Dec. 20, 2012, which claims priority to Chinese Patent Application No. 201210529679.4, filed Dec. 10, 2012, commonly assigned, both of the above-referenced applications being incorporated by reference herein for all purposes.

Additionally, this application is related to U.S. patent application Ser. Nos. 12/859,138, 13/052,869 and 13/215,028, incorporated by reference herein for all purposes. Moreover, this application is also related to U.S. patent application Ser. No. 13/646,268, incorporated by reference herein for all purposes.

2. BACKGROUND OF THE INVENTION

The present invention is directed to integrated circuits. More particularly, the invention provides adjustments of peak current. Merely by way of example, the invention has been applied to power conversion systems. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1(a) is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar junction transistor. In another example, the power switch 120 is a MOS transistor.

To regulate the output voltage within a predetermined range, information related to the output voltage and the output loading often needs to be extracted. In the power conversion system 100, such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1+R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 1(b) is a simplified diagram showing a conventional operation mechanism for the flyback power conversion system 100. As shown in FIG. 1(b), the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 1(b). The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

But the power conversion system 100 often cannot provide effective response to output loading changes. Hence it is highly desirable to improve the techniques of primary-side sensing and regulation.

3. BRIEF SUMMARY OF THE INVENTION

The present invention is directed to integrated circuits. More particularly, the invention provides adjustments of peak current. Merely by way of example, the invention has been applied to power conversion systems. But it would be recognized that the invention has a much broader range of applicability.

According to one embodiment, a system controller for regulating an output of a power conversion system includes a signal generator and a modulation and drive component. The signal generator is configured to receive at least a first signal indicating a magnitude of an input voltage received by a primary winding of a power conversion system and receive a second signal indicating a magnitude of a primary current flowing through the primary winding, and generate a third signal. The modulation and drive component is configured to receive at least the third signal, generate a drive signal based on at least information associated with the third signal, and output the drive signal to a switch to affect the primary current. The signal generator and the modulation and drive component are further configured to, if an output voltage of the power conversion system is constant and an output current of the power conversion system falls within a first predetermined range, generate a modulation signal as the drive signal based on at least information associated with the magnitude of the input voltage without taking into account the magnitude of the primary current flowing through the primary winding, and if the output voltage is constant and the output current falls within a second predetermined range, generate the modulation signal as the drive signal based on at least information associated with the magnitude of the primary current without taking into account the magnitude of the input voltage.

According to another embodiment, a system controller for regulating an output of a power conversion system includes a signal generator and a modulation and drive component. The signal generator is configured to receive at least a first signal indicating a magnitude of an input voltage received by a primary winding of a power conversion system, process information associated with the first signal, and generate a second signal based on at least information associated with the first signal. The modulation and drive component is configured to receive at least the second signal, generate a drive signal based on at least information associated with the second signal, and output the drive signal to a switch to affect a primary current flowing through the primary winding. The signal generator and the modulation and drive component are further configured to, if an output voltage of the power conversion system is constant and an output current of the power conversion system falls within a first predetermined range, generate a pulse-width-modulation signal corresponding to a pulse width and a modulation frequency as the drive signal. The pulse width decreases if the input voltage increases and if the output voltage and the output current remain constant.

According to yet another embodiment, a system controller for regulating an output of a power conversion system includes a signal generator, a first comparator, a second comparator, and a modulation and drive component. The signal generator is configured to receive at least a first signal indicating a magnitude of an input voltage received by a primary winding of a power conversion system, process information associated with the first signal, and generate a second signal based on at least information associated with the first signal. The first comparator is configured to receive the second signal and a third signal associated with a feedback signal of the power conversion system and generate a first comparison signal based on at least information associated with the second signal and the third signal. The second comparator is configured to receive the second signal and a threshold signal and generate a second comparison signal based on at least information associated with the second signal and the threshold signal. The modulation and drive component is configured to receive at least the first comparison signal and the second comparison signal, generate a drive signal based on at least information associated with the first comparison signal and the second comparison signal, and output the drive signal to a switch to affect a primary current flowing through the primary winding. The modulation and drive component is further configured to, if the third signal is larger than the threshold signal in magnitude, output the drive signal to close the switch if the second signal is smaller than the third signal, and if the threshold signal is larger than the third signal in magnitude, output the drive signal to close the switch if the second signal is smaller than the threshold signal.

In one embodiment, a method for regulating an output of a power conversion system includes receiving at least a first signal indicating a magnitude of an input voltage received by a primary winding of a power conversion system, receiving a second signal indicating a magnitude of a primary current flowing through the primary winding, and processing information associated with the first signal and the second signal. The method further includes generating a third signal, receiving at least the third signal, and processing information associated with the third signal. In addition, the method includes generating a drive signal based on at least information associated with the third signal, and outputting the drive signal to a switch to affect the primary current. The process for generating a drive signal based on at least information associated with the third signal includes, if an output voltage of the power conversion system is constant and an output current of the power conversion system falls within a first predetermined range, generating a modulation signal as the drive signal based on at least information associated with the magnitude of the input voltage without taking into account the magnitude of the primary current flowing through the primary winding, and if the output voltage is constant and the output current falls within a second predetermined range, generating the modulation signal as the drive signal based on at least information associated with the magnitude of the primary current without taking into account the magnitude of the input voltage.

In another embodiment, a method for regulating an output of a power conversion system includes receiving at least a first signal indicating a magnitude of an input voltage received by a primary winding of a power conversion system, processing information associated with the first signal, and generating a second signal based on at least information associated with the first signal. The method further includes receiving at least the second signal, processing information associated with the second signal, generating a drive signal based on at least information associated with the second signal, and outputting the drive signal to a switch to affect a primary current flowing through the primary winding. The process for generating a drive signal based on at least information associated with the second signal includes, if an output voltage of the power conversion system is constant and an output current of the power conversion system falls within a first predetermined range, generating a pulse-width-modulation signal corresponding to a pulse width and a modulation frequency as the drive signal. The pulse width decreases if the input voltage increases and if the output voltage and the output current remain constant.

In yet another embodiment, a method for regulating an output of a power conversion system includes receiving at least a first signal indicating a magnitude of an input voltage received by a primary winding of a power conversion system, processing information associated with the first signal, and generating a second signal based on at least information associated with the first signal. The method further includes receiving the second signal and a third signal associated with a feedback signal of the power conversion system, processing information associated with the second signal and the third signal, and generating a first comparison signal based on at least information associated with the second signal and the third signal. In addition, the method includes receiving the second signal and a threshold signal, processing information associated with the second signal and the threshold signal, and generating a second comparison signal based on at least information associated with the second signal and the threshold signal. Moreover, the method includes receiving at least the first comparison signal and the second comparison signal, processing information associated with the first comparison signal and the second comparison signal, generating a drive signal based on at least information associated with the first comparison signal and the second comparison signal, and outputting the drive signal to a switch to affect a primary current flowing through the primary winding. The process for outputting the drive signal to a switch to affect a primary current flowing through the primary winding includes, if the third signal is larger than the threshold signal in magnitude, outputting the drive signal to close the switch if the second signal is smaller than the third signal, and if the threshold signal is larger than the third signal in magnitude, outputting the drive signal to close the switch if the second signal is smaller than the threshold signal.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIGS. 2(a) and 2(b) are simplified diagrams showing switching frequency and peak current as functions of output current of a power conversion system according to an embodiment of the present invention.

Figure 3:
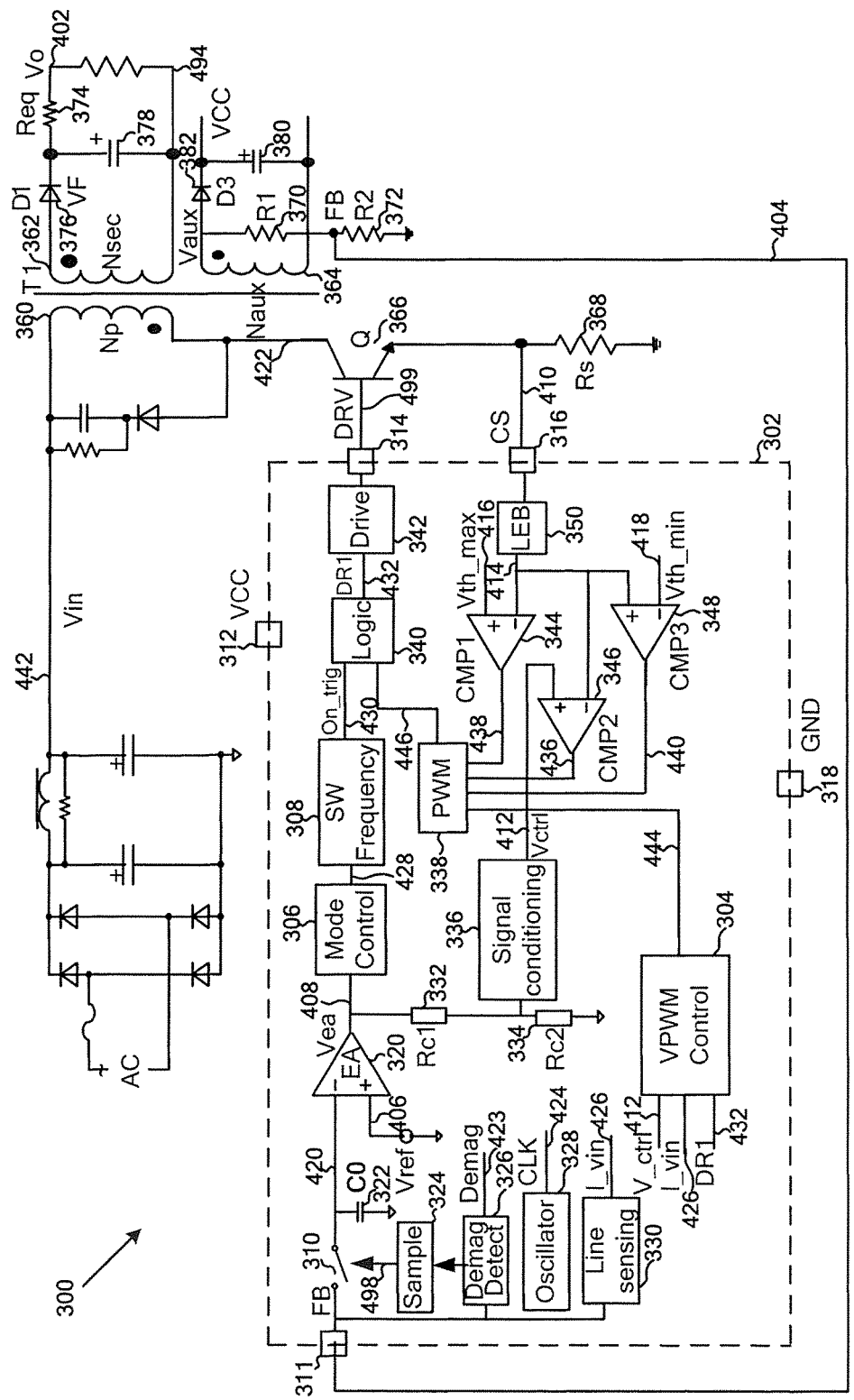

FIG. 3 is a simplified diagram showing a power conversion system that adjusts switching frequency and peak current in response to output current according to an embodiment of the present invention.

Figure 4A:
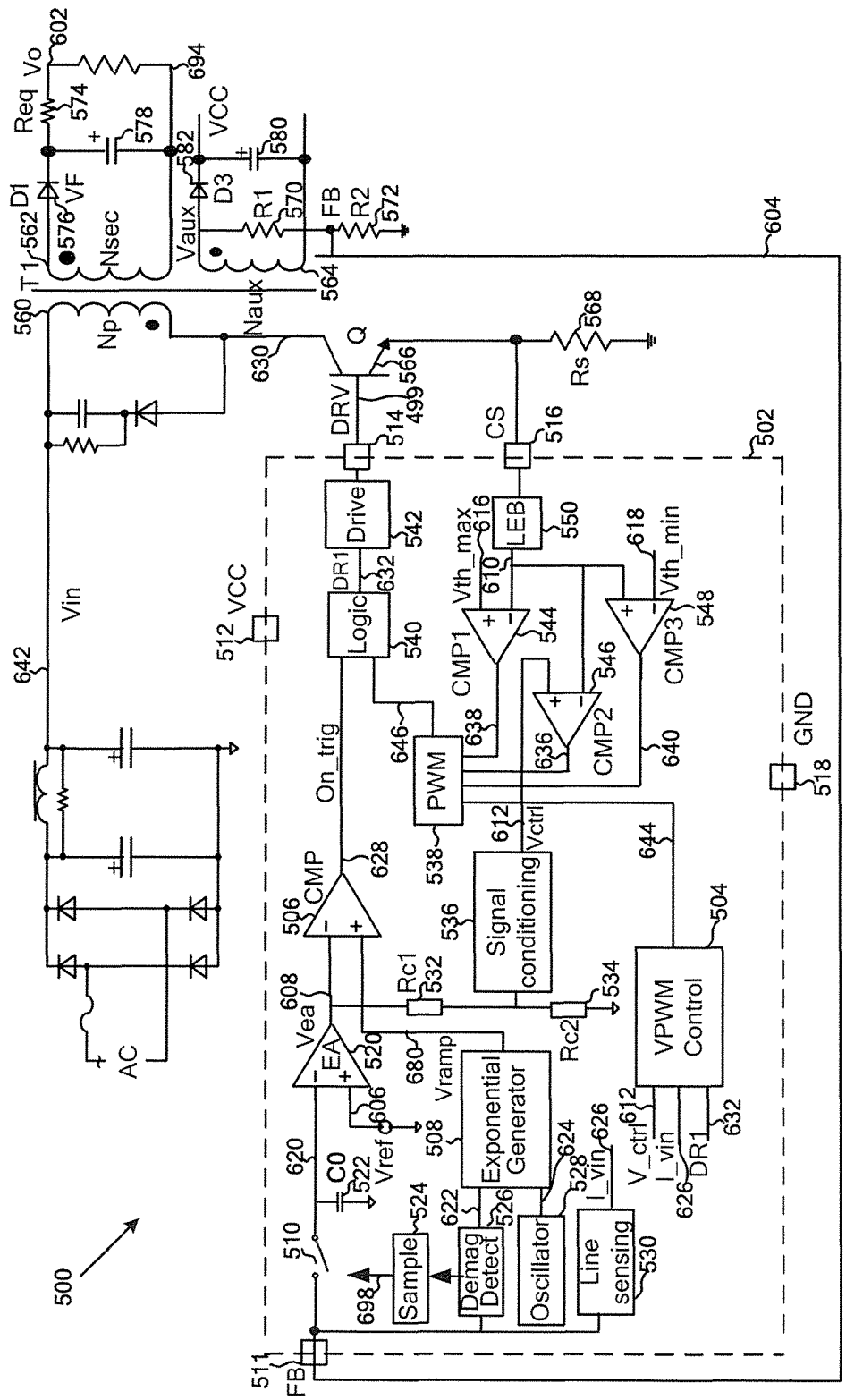

FIG. 4(a) is a simplified diagram showing a power conversion system that adjusts switching frequency and peak current in response to output current according to another embodiment of the present invention.

Figure 4B:
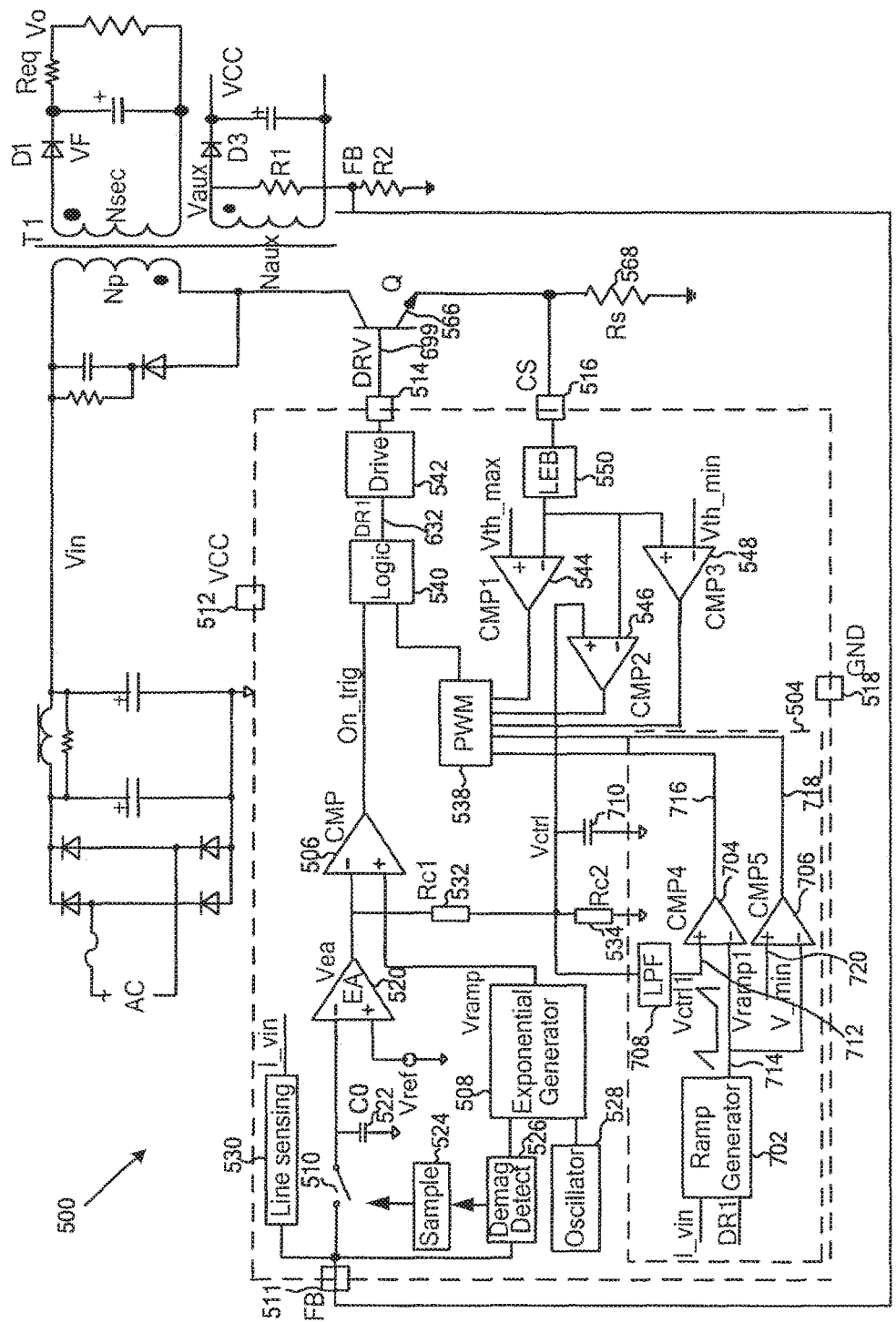

FIG. 4(b) is a simplified diagram showing certain components of the power conversion system as shown in FIG. 4(a) according to an embodiment of the present invention.

Figure 4C:
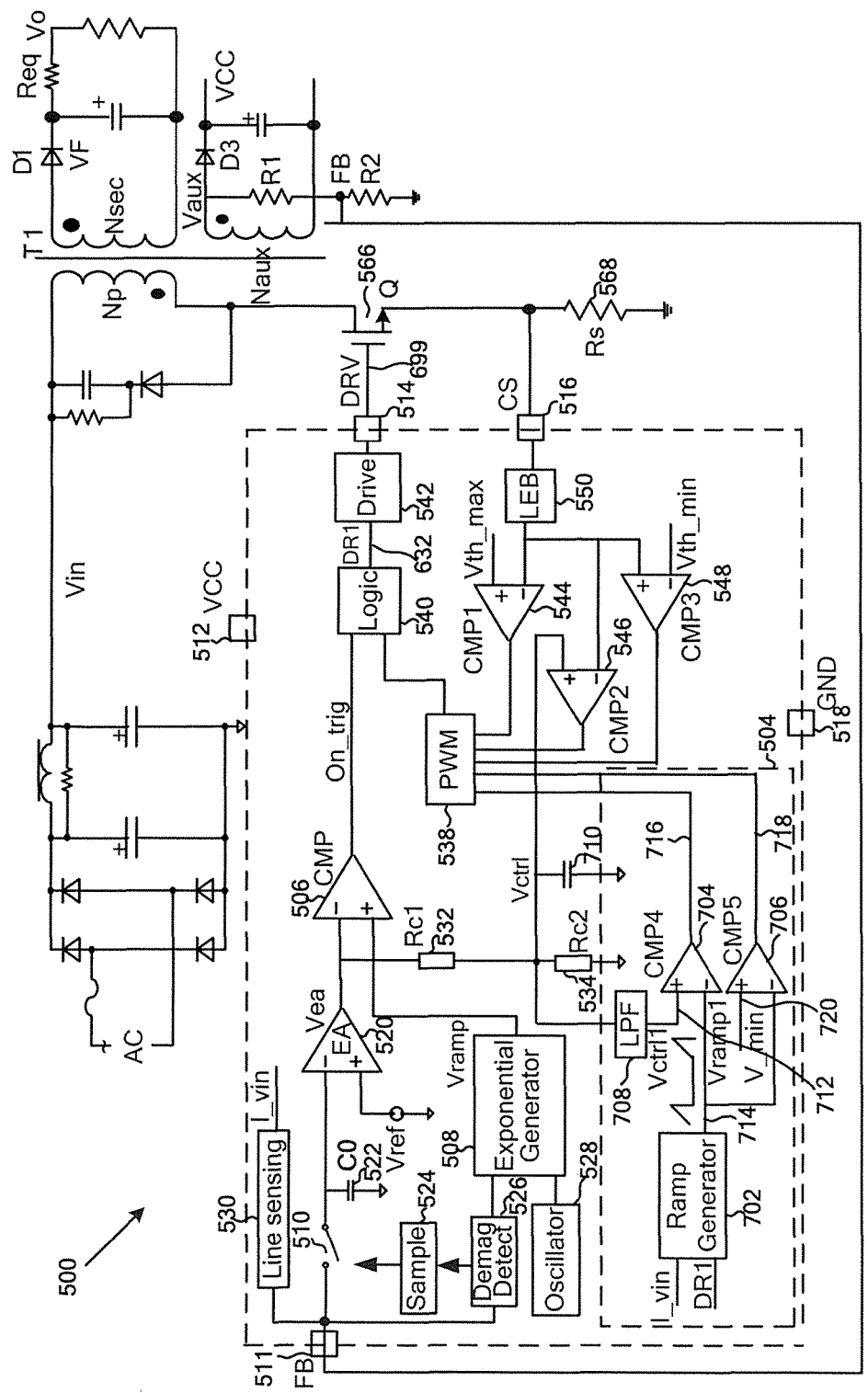

FIG. 4(c) is a simplified diagram showing a power conversion system that adjusts switching frequency and peak current in response to output current according to yet another embodiment of the present invention.

Figure 5:
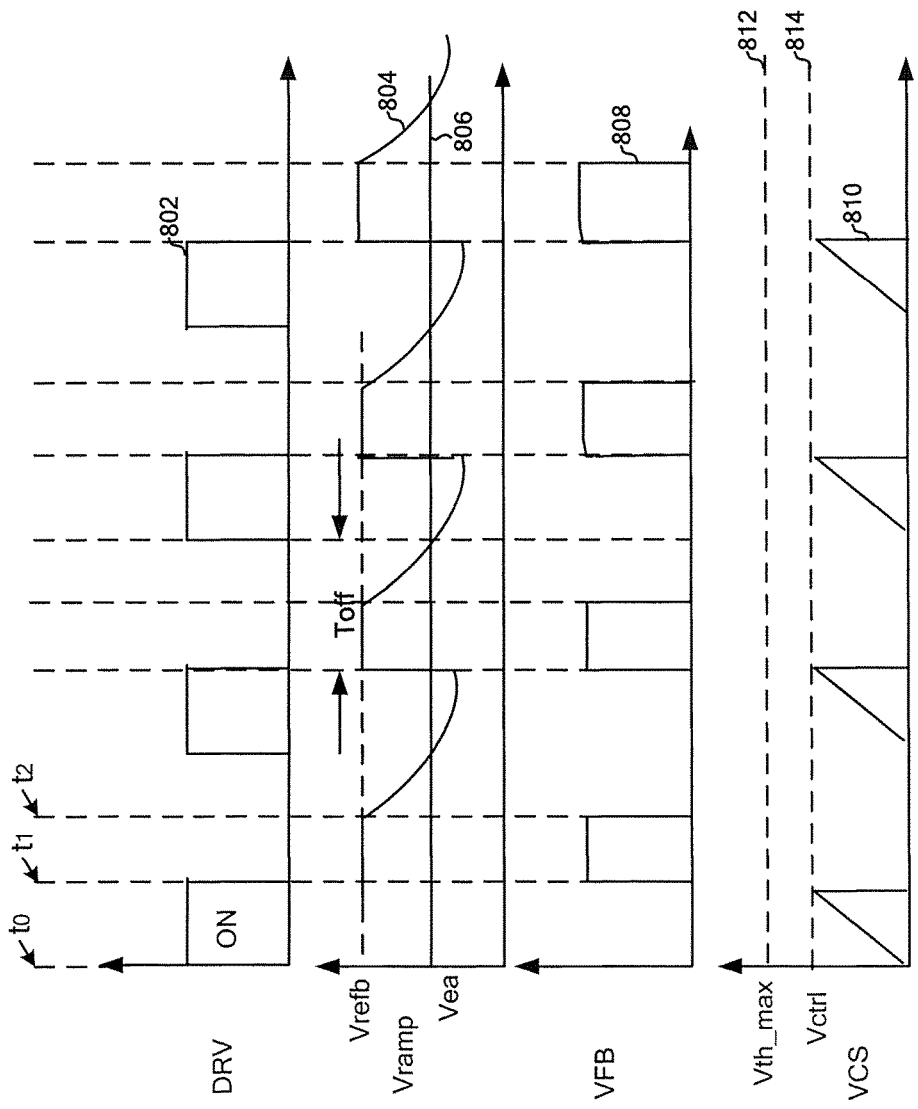

FIG. 5 is a simplified timing diagram for the power conversion system as shown in FIG. 4(a) according to an embodiment of the present invention.

Figure 6:
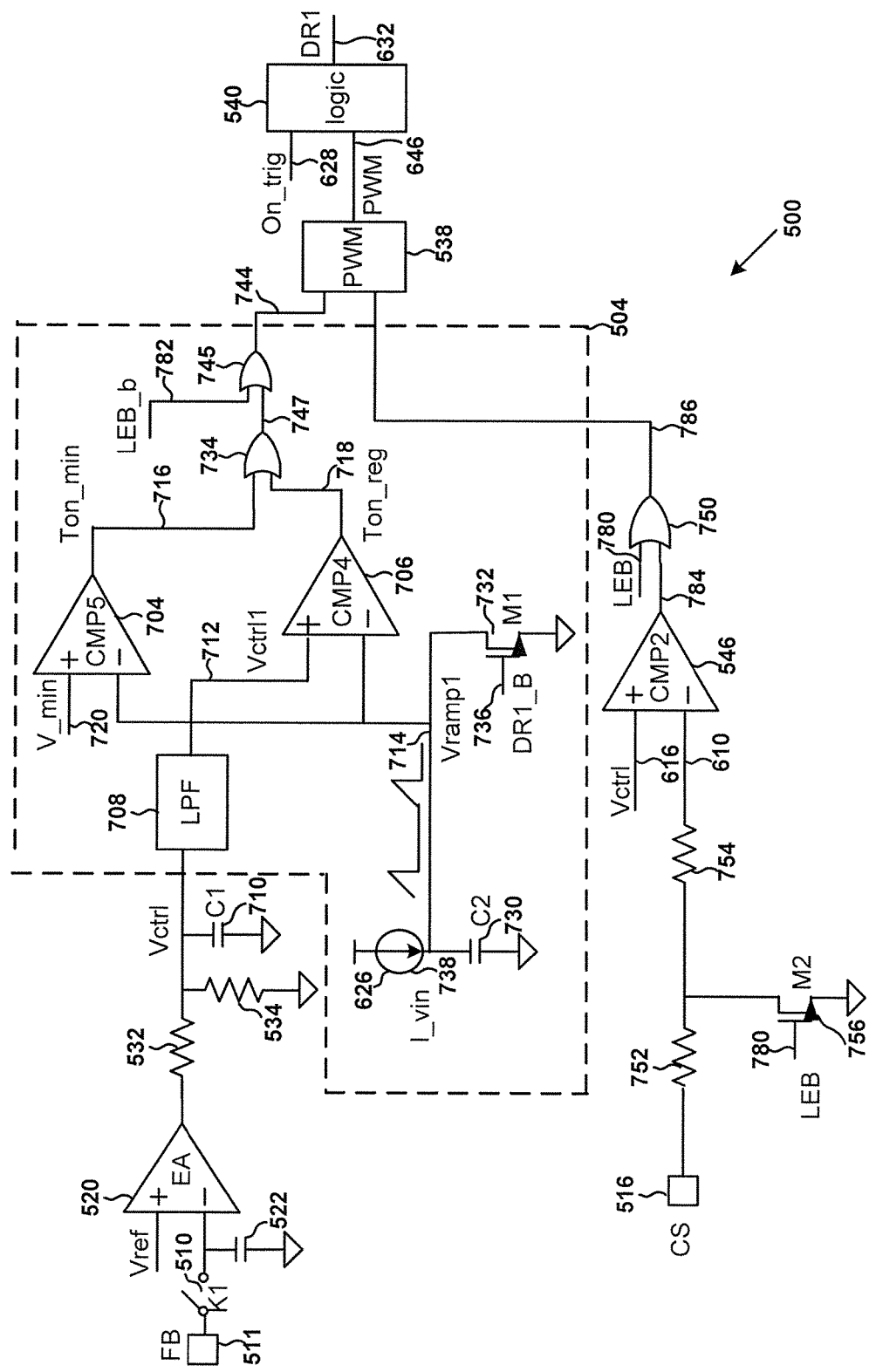

FIG. 6 is a simplified diagram showing certain components of the power conversion system including the voltage-mode component as shown in FIG. 4(a) according to an embodiment of the present invention.

FIG. 7(a) is a simplified timing diagram for the voltage-mode component as part of the power conversion system as shown in FIG. 4(a) under a particular condition according to an embodiment of the present invention.

Figure 7B:
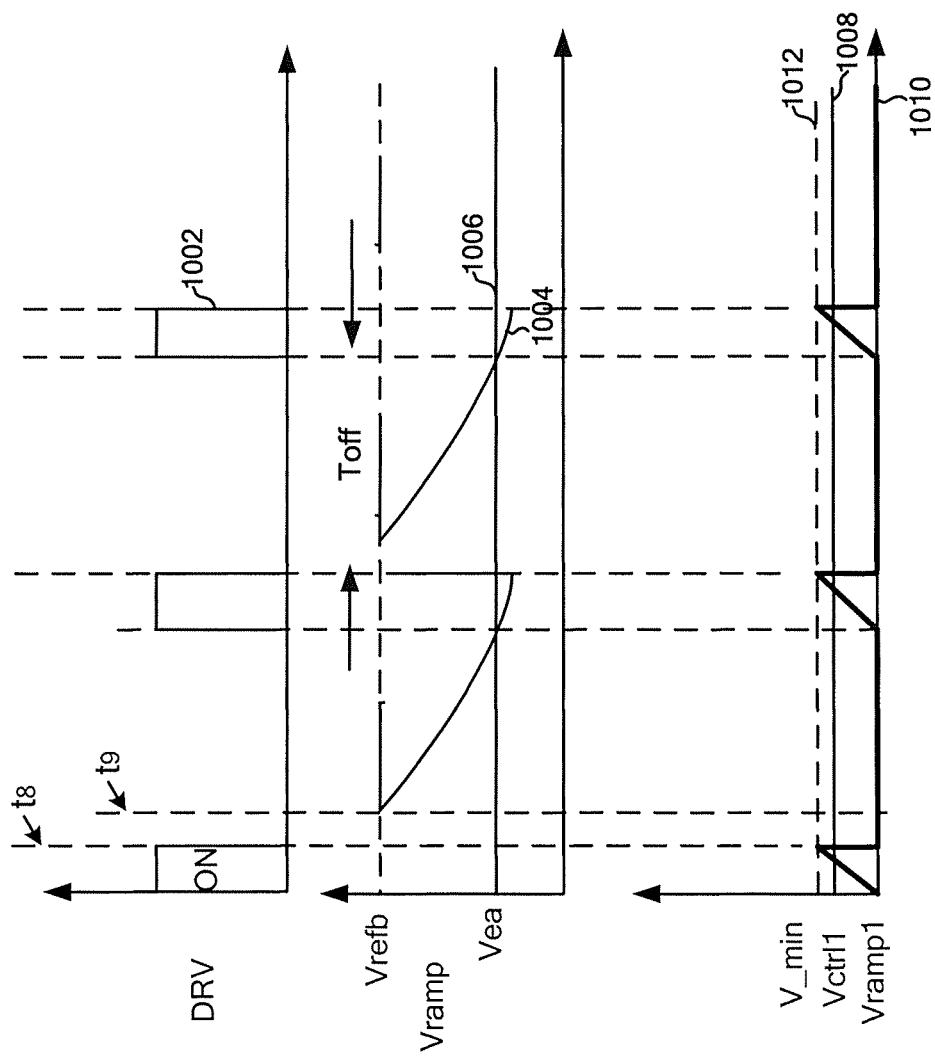

FIG. 7(b) is a simplified timing diagram for the voltage-mode component as part of the power conversion system as shown in FIG. 4(a) under another condition according to another embodiment of the present invention.

5. DETAILED DESCRIPTION OF THE INVENTION

The present invention is directed to integrated circuits. More particularly, the invention provides adjustments of peak current. Merely by way of example, the invention has been applied to power conversion systems. But it would be recognized that the invention has a much broader range of applicability.

Figure 1A:
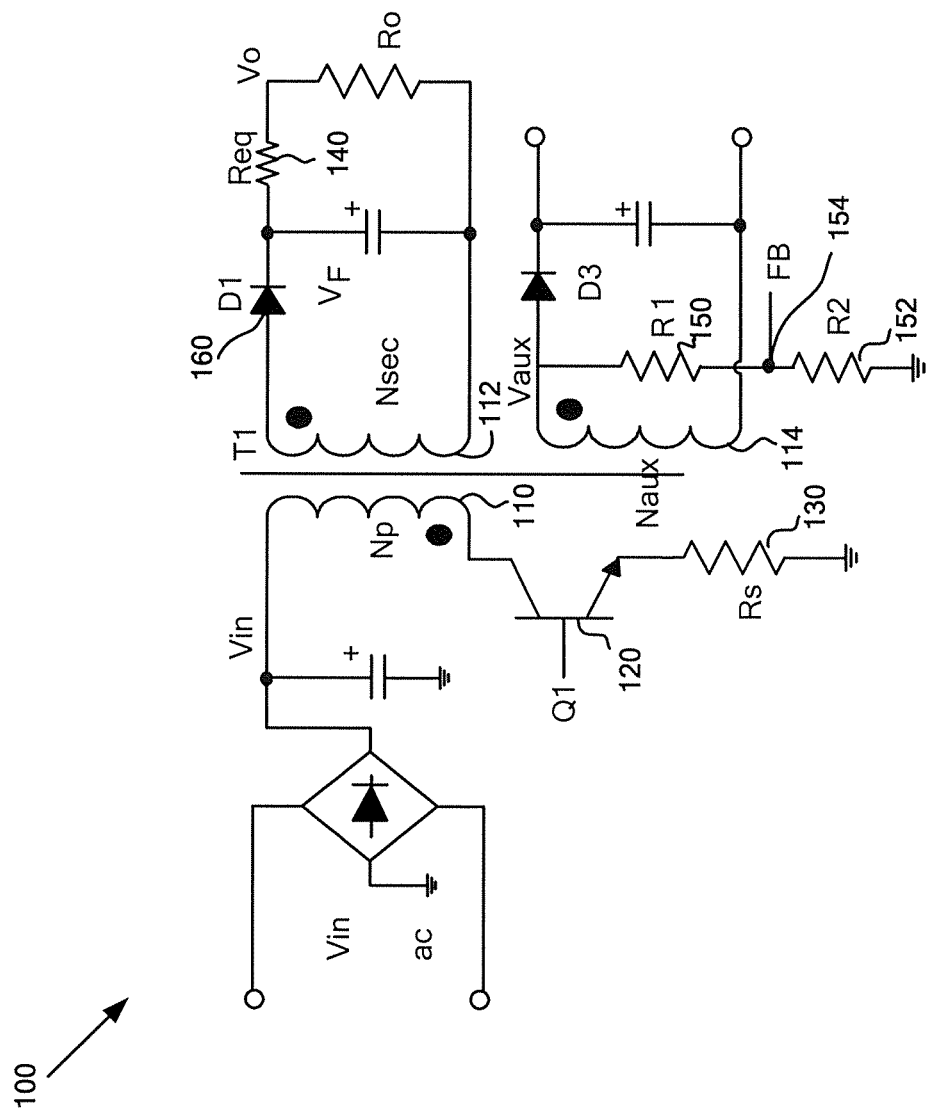
FIG. 1(a) is a simplified diagram showing a conventional flyback power conversion system with primary-side sensing and regulation.
Figure 1B:
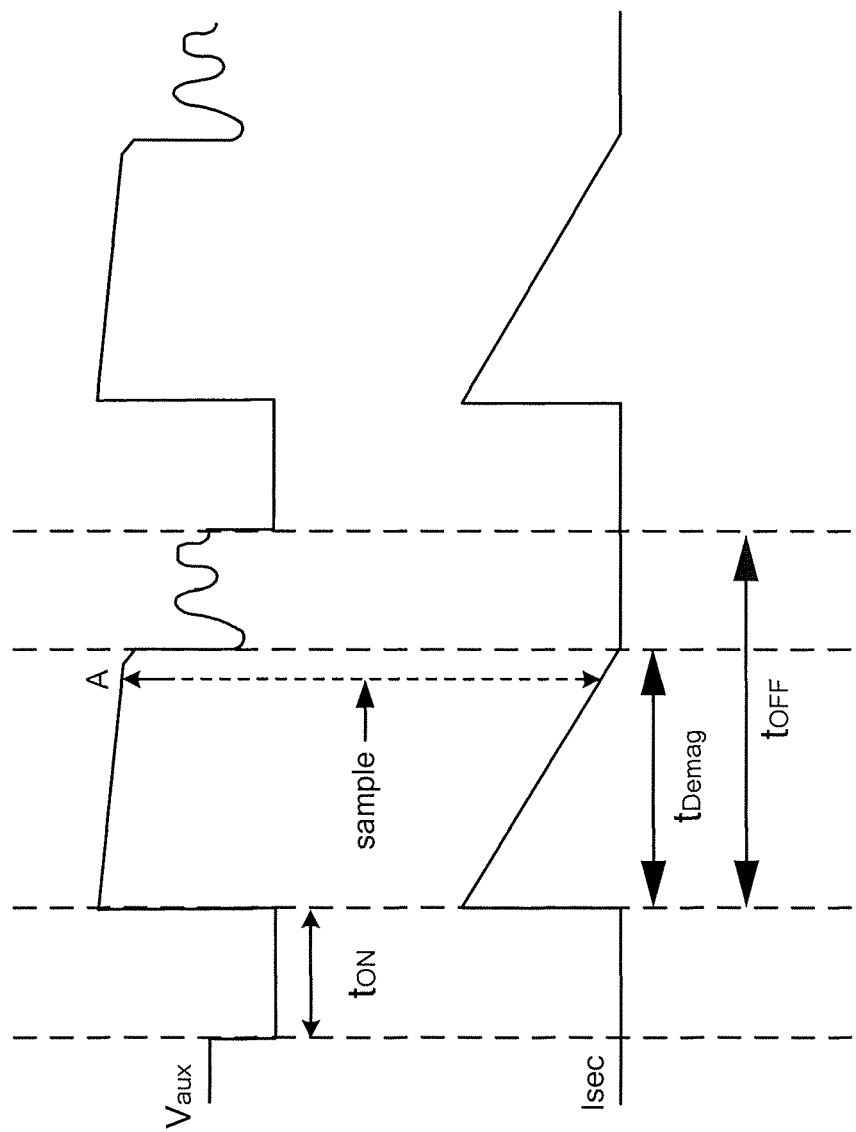
FIG. 1(b) is a simplified diagram showing a conventional operation mechanism for the flyback power conversion system as shown in FIG. 1(a).

Referring to FIGS. 1(a) and 1(b), information about the output voltage of the power conversion system 100 often is sampled only once every switching period. The switching period is inversely proportional to the switching frequency, which usually is set low at no load or light load conditions to reduce power consumption. But the low switching frequency often leads to poor dynamic response for the power conversion system 100 if the load changes from no load or light load to full load. For example, if the switching frequency is several hundred Hz at no load or light load conditions, information about the output voltage of the power conversion system 100 is sampled once every several msec. If the load changes from no load or light load to full load (e.g., the output current changing to 1 A at full load), the output voltage may drop below an acceptable level, because the controller does not respond until the next sampling is performed after, for example, several msec. One way to solve this problem is to increase the switching frequency at no load or light load conditions. But if the switching frequency is increased, the peak current of the primary winding at no load or light load conditions should be limited such that the output voltage does not exceed an acceptable level.

If the switching frequency is further increased, the peak current of the primary winding at no load or light load conditions should be further reduced to decrease the standby power consumption. In a conventional current-mode pulse-width-modulation (PWM)/pulse-frequency-modulation (PFM) flyback power conversion system (e.g., the system 100), the information associated with a primary current flowing through the primary winding is often needed to generate a pulse signal (e.g., a PWM signal or a PFM signal) to close (e.g., to turn on) or open (e.g., to turn off) a power switch (e.g., the switch 120) in order to affect the power delivered to the output load. A leading edge blanking (LEB) pulse is usually used to chop off on-spikes which often appear every cycle at the beginning of a current-sensing process. For example, the width of a leading edge blanking pulse is usually in the range of 250 ns to 350 ns. The blanking pulse width and the propagation delay of a controller often determine a minimum duration of an on-time period within a switching period associated with the power switch (e.g., the switch 120). Usually, such a minimum duration of the on-time period is larger than what is needed to regulate the output voltage at no load or light load conditions in some applications, especially when the line input voltages are high.

FIGS. 2(a) and 2(b) are simplified diagrams showing switching frequency and peak current as functions of output current of a power conversion system according to an embodiment of the present invention. These diagrams are merely examples, which should not unduly limit the scope of the claims. One of ordinary skill in the art would recognize many variations, alternatives, and modifications. The waveform 202 represents the switching frequency (e.g., $F_{SW}$) as a function of output current (e.g., $I_{out}$), and the waveform 204 represents the peak current (e.g., $I_{s\_peak}$) for the primary winding as a function of output current (e.g., $I_{out}$). For example, if $I_{out}=I_1$, the power conversion system is at no load conditions; if $I_{out}=I_6$, the power conversion system is at maximum load conditions; and if $I_5 \leq I_{out} < I_6$, the power conversion system is at full load conditions. In another example, $I_1 \leq I_2 \leq I_3 \leq I_4 \leq I_5 \leq I_6$. In yet another example, if $I_1 \leq I_{out} \leq I_6$, the power conversion system operates in an output-voltage regulation mode, for example, a constant-voltage (CV) mode. In yet another example, if $I_{out} > I_6$, as the output power remains at a maximum power, the output voltage drops with the increasing output current, and the power conversion system no longer operates in output-voltage regulation mode, e.g., the CV mode. In yet another example, if the power conversion system operates in the constant-voltage (CV) mode, the output voltage is regulated to be at a predetermined voltage value.

As shown in FIG. 2(a), the switching frequency (e.g., $F_{SW}$) keeps at a minimum frequency $f_{min}$ and does not change with the output current (e.g., $I_{out}$) if $I_1 \leq I_{out} \leq I_2$ according to one embodiment. For example, the switching frequency (e.g., $F_{SW}$) changes with the output current (e.g., $I_{out}$) at a slope $S_{1f}$ if $I_2 \leq I_{out} \leq I_3$. In another example, the switching frequency (e.g., $F_{SW}$) increases from the minimum frequency $f_{min}$ (e.g., at $I_1$) to a frequency $f_1$ (e.g., at $I_3$). In yet another example, the switching frequency (e.g., $F_{SW}$) changes with the output current (e.g., $I_{out}$) at a slope $S_{2f}$ if $I_3 \leq I_{out} \leq I_5$. In yet another example, the switching frequency (e.g., $F_{SW}$) increases from the frequency $f_1$ (e.g., at $I_3$) to a frequency $f_2$ (e.g., at $I_5$). In yet another example, the switching frequency (e.g., $F_{SW}$) changes with the output current (e.g., $I_{out}$) at a slope $S_{3f}$ if $I_5 \leq I_{out} \leq I_6$. In yet another example, the switching frequency (e.g., $F_{SW}$) increases from the frequency $f_2$ (e.g., at $I_5$) to a maximum frequency $f_{max}$ (e.g., at $I_6$). In yet another example, the switching frequency (e.g., $F_{SW}$) keeps at the maximum frequency $f_{max}$ and does not change with the output current (e.g., $I_{out}$) if $I_{out} > I_6$. In yet another example, each of the slopes $S_{1f}$, $S_{2f}$ and $S_{3f}$ is larger than zero. In yet another example, the slope $S_{2f}$ is equal to the slope $S_{3f}$.

As shown in FIG. 2(b), the peak current (e.g., $I_{s\_peak}$) for each switching period (e.g., $T_{sw}$) changes with the output current (e.g., $I_{out}$) at a slope $S_{1p}$ if $I_1 \leq I_{out} \leq I_2$ according to another embodiment. For example, the peak current (e.g., $I_{s\_peak}$) for each switching period (e.g., $T_{sw}$) changes with the output current (e.g., $I_{out}$) at a slope $S_{2p}$ if $I_2 \leq I_{out} \leq I_4$. In another example, the peak current (e.g., $I_{s\_peak}$) for each switching period (e.g., $T_{sw}$) changes with the output current (e.g., $I_{out}$) at a slope $S_{3p}$ if $I_4 \leq I_{out} \leq I_5$. In yet another example, the peak current (e.g., $I_{s\_peak}$) for each switching period (e.g., $T_{sw}$) changes with the output current (e.g., $I_{out}$) at a slope $S_{4p}$ if $I_5 \leq I_{out} \leq I_6$. In yet another example, the slopes $S_{1p}$ and $S_{3p}$ each are larger than zero. In yet another example, the slopes $S_{2p}$ and $S_{4p}$ each are equal to or larger than zero. In yet another example, the peak current (e.g., $I_{peak}$) has a minimum value $I_{s\_min}$ (e.g., at $I_1$) and a maximum value $I_{s\_max}$ (e.g., at $I_5$).

According to yet another embodiment, the power conversion system operates with voltage-mode pulse-width modulation (VPWM) for $I_1 \leq I_{out} \leq I_2$. For example, in the VPWM mode, the information associated with the primary current flowing through the primary winding current is not needed for generating a pulse signal (e.g., a PWM signal) to close (e.g., to turn on) or open (e.g., to turn off) a power switch. In another example, the leading edge blanking is not necessary for the VPWM mode, and thus the duration of an on-time period within a switching period associated with a power switch is not limited by a blanking time duration. In some embodiments, the power conversion system changes to current-mode modulation (e.g., pulse-width modulation or pulse-frequency modulation) for $I_2 \leq I_{out} \leq I_6$. For example, the power conversion system operates with pulse-frequency modulation (PFM) for $I_2 \leq I_{out} \leq I_4$. In another example, the power conversion system operates with both pulse-frequency modulation and pulse-width modulation for $I_4 \leq I_{out} \leq I_5$. In yet another example, the power conversion system operates with pulse-frequency modulation for $I_5 \leq I_{out} \leq I_6$.

As shown above and further emphasized here, FIGS. 2(a) and 2(b) are merely examples, which should not unduly limit the scope of the claims. One of ordinary skill in the art would recognize many variations, alternatives, and modifications. For example, the switching frequency (e.g., $F_{SW}$) changes with the output current (e.g., $I_{out}$) at a slope $S_{4f}$ if $I_5 \leq I_{out} \leq I_m$, and changes with the output current (e.g., $I_{out}$) at a slope $S_{5f}$ if $I_m \leq I_{out} \leq I_6$, where $I_5 \leq I_m \leq I_6$, and $S_{4f}$ and $S_{5f}$ are different.

FIG. 3 is a simplified diagram showing a power conversion system that adjusts switching frequency and peak current in response to output current according to an embodiment of the present invention. This diagram is merely an example, which should not unduly limit the scope of the claims. One of ordinary skill in the art would recognize many variations, alternatives, and modifications. The power conversion system 300 includes a system controller 302, a primary winding 360, a secondary winding 362, an auxiliary winding 364, a switch 366, a current sensing resistor 368, an equivalent resistor 374 for an output cable, resistors 370 and 372, rectifying diodes 376 and 382, and capacitors 378 and 380. The system controller 302 includes a voltage-mode component 304, a mode controller 306, a frequency component 308, a sampling switch 310, an error amplifier 320, a capacitor 322, a sampling controller 324, a demagnetization detector 326, an oscillator 328, a line sensing component 330, resistors 332 and 334, a signal conditioning component 336, a modulation component 338, a logic component 340, a driving component 342, comparators 344, 346 and 348, and a LEB component 350. In addition, the system controller 302 includes terminals 311, 312, 314, 316 and 318. For example, the switch 366 is a transistor. In certain embodiments, the signal conditioning component 336 is omitted. In some embodiments, the LEB component 350 is omitted.

According to one embodiment, information about an output voltage 402 is extracted through the auxiliary winding 364. For example, the auxiliary winding 364, together with the resistors 370 and 372, generates a feedback signal 404. In another example, the system controller 302 receives the feedback signal 404 at the terminal 311 (e.g., terminal FB). When the switch 366 is opened (e.g., being turned off), the energy stored in the transformer including the primary winding 360 and the secondary winding 362 is released to the output terminal in certain embodiments. For example, the demagnetization process associated with the transformer starts, and a secondary current 494 flowing through the secondary winding 362 decreases in magnitude (e.g., linearly). In another example, when the demagnetization process almost ends and the secondary current 494 flowing through the secondary winding 362 approaches zero, the sampling controller 324 outputs a sampling signal 498 to close (e.g., to turn on) the sampling switch 310 to sample the feedback signal 404. In yet another example, after the sampling process is completed, the sampling controller 324 changes the sampling signal 498 to open (e.g., to turn off) the switch 310. In yet another example, the sampled signal is held on the capacitor 322. In yet another example, a sampled and held signal 420 is generated at the capacitor 322 and received by the error amplifier 320 (e.g., at an inverting terminal). In yet another example, the error amplifier 320 also receives a reference signal 406 (e.g., $V_{ref}$) and generates an amplified signal 408 which is associated with a difference between the signal 420 and the reference signal 406.

The amplified signal 408 is used for selecting an operation mode (e.g., by the mode controller 306), for adjusting switching frequency (e.g., by the frequency component 308), and for affecting peak values of a primary current 422 that flows through the primary winding 360 so as to affect the power delivered to the output, in some embodiments. For example, the amplified signal 408 is received by the mode controller 306 which generates a signal 428. In another example, the frequency component 308 receives the signal 428 and outputs a signal 430 to the logic component 340 which generates a signal 432. In yet another example, the driving component receives the signal 432 and generates a driving signal 499 to affect the status of the switch 314. In yet another example, the amplified signal 408 indicates the output load conditions in closed loop regulation. In yet another example, the waveform of the driving signal 499 is substantially the same as the waveform of the signal 432.

According to another embodiment, the primary current 422 that flows through the primary winding 360 is sensed by the current sensing resistor 368, which in response outputs a current sensing signal 410 to the comparators 344, 346 and 348 (e.g., through the LEB component 350). For example, if the switch 366 is closed (e.g., being turned on), the transformer stores energy and the primary current 422 increases in magnitude (e.g., linearly), causing the current sensing signal 410 (e.g., $V_{cs}$) to also increase in magnitude (e.g., linearly). In another example, the comparator 346 also receives a signal 412 which is generated by the signal conditioning component 336 and associated with the amplified signal 408, and outputs a comparison signal 436 to the modulation component 338. In yet another example, the comparator 344 also receives a threshold signal 416 (e.g., $V_{th\_max}$) and outputs a comparison signal 438 to the modulation component 338. In yet another example, the comparator 348 also receives another threshold signal 418 (e.g., $V_{th\_min}$ which is smaller than $V_{th\_max}$ in magnitude) and outputs a comparison signal 440 to the modulation component 338.

According to yet another embodiment, the feedback signal 404 is received by at least the demagnetization detector 326 and the oscillator 328. For example, the demagnetization detector 326 outputs a detection signal 423, and the oscillator 328 also outputs a clock signal 424. In another example, the line sensing component 330 outputs a signal 426 which is associated with an input signal 442 (e.g., $V_{in}$). In yet another example, the voltage-mode component 304 receives the signals 412, 426 and 432 and outputs a signal 444 which is received by the modulation component 338. In yet another example, the modulation component 338 outputs a modulation signal 446 to the logic component 340 which outputs the signal 432 to close (e.g., to turn on) or to open (e.g., to turn off) the switch 366 in order to affect the primary current 422. In yet another example, the signal 426 is proportional to the signal 442 in magnitude, as follows.

If $I\_vin \geq 0, I\_vin = \alpha \times V_{in} - \beta$  (Equation 5)

where I_vin represents the signal 426, $V_{in}$ represents the signal 442, and α and β represent constants respectively.

As discussed above and further emphasized here, FIG. 3 is merely an example, which should not unduly limit the scope of the claims. One of ordinary skill in the art would recognize many variations, alternatives, and modifications. For example, the switch 366 is a bipolar junction transistor (BJT), and the driving component 342 generates a current signal (e.g., the signal 499) to drive the switch 366. In another example, the switch 366 is a metal-oxide-semiconductor field-effect transistor (MOSFET) or an insulated-gate bipolar transistor (IGBT), and the driving component 342 generates a voltage signal (e.g., the signal 499) to drive the switch 366.

FIG. 4(a) is a simplified diagram showing a power conversion system that adjusts switching frequency and peak current in response to output current according to another embodiment of the present invention. This diagram is merely an example, which should not unduly limit the scope of the claims. One of ordinary skill in the art would recognize many variations, alternatives, and modifications. The power conversion system 500 includes a system controller 502, a primary winding 560, a secondary winding 562, an auxiliary winding 564, a switch 566, a current sensing resistor 568, an equivalent resistor 574 for an output cable, resistors 570 and 572, rectifying diodes 576 and 582, and capacitors 578 and 580. The system controller 502 includes a voltage-mode component 504, comparators 506, 544, 546 and 548, a exponential generator 508, a sampling switch 510, an error amplifier 520, a capacitor 522, a sampling controller 524, a demagnetization detector 526, an oscillator 528, a line sensing component 530, resistors 532 and 534, a signal conditioning component 536, a modulation component 538, a logic component 540, a driving component 542, and a LEB component 550. In addition, the system controller 502 includes terminals 511, 512, 514, 516 and 518. For example, the switch 566 is a transistor (e.g., a bipolar junction transistor). In certain embodiments, the signal conditioning component 536 is omitted. In some embodiments, the LEB component 550 is omitted if the power conversion system 500 operates with a voltage-mode control mode.

For example, the power conversion system 500 is the same as the power conversion system 300. In another example, the system controller 502 is the same as the system controller 302. In yet another example, the primary winding 560, the secondary winding 562, the auxiliary winding 564, the switch 566, the current sensing resistor 568, the equivalent resistor 574, the resistors 570 and 572, the rectifying diodes 576 and 582, the capacitors 578 and 580, the voltage-mode component 504, the comparators 544, 546 and 548, the sampling switch 510, the error amplifier 520, the capacitor 522, the sampling controller 524, the demagnetization detector 526, the oscillator 528, the line sensing component 530, the resistors 532 and 534, the signal conditioning component 536, the modulation component 538, the logic component 540, the driving component 542, and the LEB component 550 are the same as the primary winding 360, the secondary winding 362, the auxiliary winding 364, the switch 366, the current sensing resistor 368, the equivalent resistor 374, the resistors 370 and 372, the rectifying diodes 376 and 382, the capacitors 378 and 380, the voltage-mode component 304, the comparators 344, 346 and 348, the sampling switch 310, the error amplifier 320, the capacitor 322, the sampling controller 324, the demagnetization detector 326, the oscillator 328, the line sensing component 330, the resistors 332 and 334, the signal conditioning component 336, the modulation component 338, the logic component 340, the driving component 342, and the LEB component 350, respectively. In yet another example, the terminals 311, 312, 314, 316 and 318 are the same as the terminals 511, 512, 514, 516 and 518, respectively. In yet another example, the exponential generator 508 and the comparator 506 are part of the mode controller 306 and the frequency component 308 as shown in FIG. 3, and the mode controller 306 and the frequency component 308 include one or more additional components.

According to one embodiment, information about an output voltage 602 is extracted through the auxiliary winding 564. For example, the auxiliary winding 564, together with the resistors 570 and 572, generates a feedback signal 604. In another example, the system controller 502 receives the feedback signal 604 at the terminal 511 (e.g., terminal FB). When the switch 566 is opened (e.g., being turned off), the energy stored in the transformer including the primary winding 560 and the secondary winding 562 is released to the output terminal in certain embodiments. For example, the demagnetization process associated with the transformer starts, and a secondary current 694 flowing through the secondary winding 562 decreases in magnitude (e.g., linearly). In another example, when the demagnetization process almost ends and the secondary current 694 flowing through the secondary winding 562 approaches zero, the sampling controller 524 outputs a sampling signal 698 to close (e.g., to turn on) the sampling switch 510 to sample the feedback signal 604. In yet another example, after the sampling process is completed, the sampling controller 524 changes the sampling signal 698 to open (e.g., to turn off) the switch 510. In yet another example, the sampled signal is held on the capacitor 522. In yet another example, a sampled and held signal 620 is generated at the capacitor 522 and received by the error amplifier 520 (e.g., at an inverting terminal). In yet another example, the error amplifier 520 also receives a reference signal 606 (e.g., $V_{ref}$) and generates an amplified signal 608 which is associated with a difference between the signal 620 and the reference signal 606. The amplified signal 608 is used for adjusting switching frequency and for affecting peak values of a primary current 630 that flows through the primary winding 560 so as to affect the power delivered to the output, in some embodiments.

According to another embodiment, the feedback signal 604 is received by at least the demagnetization detector 526 and the oscillator 528. For example, the exponential generator 508 receives a detection signal 622 from the demagnetization detector 526 and a clock signal 624 from the oscillator 528, and outputs a signal 680 (e.g., $V_{ramp}$) to the comparator 506. In another example, the comparator 506 also receives the amplified signal 608 and outputs a comparison signal 628 to the logic component 540 in order to affect the switching frequency. In yet another example, the logic component 540 generates a signal 632 to the driving component 542 which outputs a signal 699 in order to close (e.g., to turn on) or open (e.g., to turn off) the switch 566. In yet another example, the signal 680 (e.g., $V_{ramp}$) is an exponential signal. In yet another example, the waveform of the signal 699 is substantially the same as the waveform of the signal 632.

According to yet another embodiment, the primary current 630 that flows through the primary winding 560 is sensed by the current sensing resistor 568, which in response outputs a current sensing signal 610 to the comparators 544, 546 and 548 (e.g., through the LEB component 550). For example, if the switch 566 is closed (e.g., being turned on), the transformer stores energy and the primary current 630 increases in magnitude (e.g., linearly), causing the current sensing signal 610 (e.g., $V_{cs}$) to also increase in magnitude (e.g., linearly). In another example, the comparator 546 also receives a signal 612 (e.g., $V_{ctrl}$) which is generated by the signal conditioning component 536 and associated with the amplified signal 608, and outputs a comparison signal 636 to the modulation component 538. In yet another example, the comparator 544 also receives a threshold signal 616 (e.g., $V_{th\_max}$) and outputs a comparison signal 638 to the modulation component 538. In yet another example, the comparator 548 receives another threshold signal 618 (e.g., $V_{th\_min}$ which is smaller than $V_{th\_max}$ in magnitude) and outputs a comparison signal 640 to the modulation component 538.

As shown in FIG. 4(a), the line sensing component 530 outputs a signal 626 which is associated with an input signal 642 (e.g., $V_{in}$) in certain embodiments. For example, the voltage-mode component 504 receives the signals 612, 626 and 632 and outputs a signal 644 which is received by the modulation component 538. In yet another example, the modulation component 538 outputs a modulation signal 646 to the logic component 540 which outputs the signal 632 to close (e.g., to turn on) or to open (e.g., to turn off) the switch 566 in order to affect the primary current 630. In yet another example, the signal 626 is proportional to the signal 642 in magnitude.

FIG. 4(b) is a simplified diagram showing certain components of the power conversion system 500 according to an embodiment of the present invention. This diagram is merely an example, which should not unduly limit the scope of the claims. One of ordinary skill in the art would recognize many variations, alternatives, and modifications. As shown in FIG. 4(b), the system controller 502 further includes a low pass filter 708 and a capacitor 710. The voltage-mode component 504 includes a signal generator 702, comparators 704 and 706, and a low pass filter 708. For example, the signal conditioning component 536 includes the capacitor 710. In another example, the switch 566 is a bipolar junction transistor.

As shown in FIG. 4(a) and FIG. 4(b), the amplified signal 608 is attenuated and filtered by a compensation network including the resistors 532 and 534, the capacitor 710 and the low pass filter 708, and a filtered signal 712 is received by the comparator 704 (e.g., at a non-inverting terminal), in some embodiments. For example, the signal generator 702 receives the signals 626 and 632 and outputs a signal 714 (e.g., $V_{ramp1}$) to the comparators 704 and 706. In another example, the comparator 704 outputs a signal 716 to the modulation component 538, and the comparator 706 which also receives a threshold signal 720 (e.g., V_min) outputs a signal 718 to the modulation component 538. In yet another example, the signal 644 is generated by an OR gate that receives the signals 716 and 718 as inputs. The signal 714 is a ramping signal associated with a ramping period which includes a ramping-up period, a ramping-down period, and an off period in some embodiments. For example, during the ramping-up period, the signal 714 increases in magnitude; during the ramping-down period, the signal 714 decreases in magnitude; and during the off period, the signal 714 keeps at a low magnitude (e.g., zero).

According to one embodiment, a switching period of the switch 566 includes an on-time period during which the switch 566 is closed (e.g., being turned on) and an off-time period during which the switch 566 is open (e.g., being turned off). For example, the duration of the on-time period in each switching period and peak values of the primary current 630 are affected by the signal 646 generated from the modulation component 538, and thus are affected by the comparison of the signal 712 and the signal 714. For example, the signal 714 is a ramping signal which increases in magnitude at a slope P in each switching period, and the slope P of the signal 714 changes with the signal 626. In another example, the slope P increases as the signal 626 increases in magnitude, while the slope P decreases as the signal 626 decreases in magnitude. In yet another example, the signal 714 is triggered in response to the signal 632 during each switching period. In yet another example, the signal 714 begins to increase in magnitude when the signal 632 changes from a logic low level to a logic high level.

According to another embodiment, the off-time period in each switching period is used to adjust switching frequency associated with the switching period. For example, the duration of the off-time period in each switching period is affected by the comparison signal 628 and thus is affected by the comparison of the signal 608 and the signal 680 (e.g., $V_{ramp}$) generated by the exponential generator 508. In another example, the exponential generator 508 includes a switch-capacitor circuit that is affected by the clock signal 624 generated by the oscillator 528 (e.g., with a fixed frequency). In yet another example, the signal 680 is determined according to the following equation:

$$V_{ramp}(n) = (V_{refb} - V_{refa}) \times e^{\frac{nT}{\tau}} + V_{refa} \quad \text{(Equation 6)}$$

where $V_{refb}$ represents an upper limit of the signal 608, $V_{refa}$ represents a lower limit of the signal 608, T represents a clock period of the clock signal 624 corresponding to the fixed frequency of the oscillator 528, n represents the number of the clock period, and τ represents a time constant. As an example, τ is determined according to the following equation.

$$\tau = \begin{cases} 128T & 0 \le n \le 64 \\ 256T & 64 \le n \le 128 \\ 512T & 128 \le n \le 256 \\ 1024T & 256 \le n \le 512 \end{cases} \quad \text{(Equation 7)}$$

As discussed above and further emphasized here, FIG. 4(a) and FIG. 4(b) are merely examples, which should not unduly limit the scope of the claims. One of ordinary skill in the art would recognize many variations, alternatives, and modifications. For example, the switch 566 is an IGBT. In another example, the switch 566 is a MOSFET, as shown in FIG. 4(c).

FIG. 4(c) is a simplified diagram showing a power conversion system that adjusts switching frequency and peak current in response to output current according to yet another embodiment of the present invention. This diagram is merely an example, which should not unduly limit the scope of the claims. One of ordinary skill in the art would recognize many variations, alternatives, and modifications. As shown in FIG. 4(c), the switch 566 is a MOSFET. According to one embodiment, the logic component 540 generates the signal 632 to the driving component 542 which outputs a voltage signal (e.g., the signal 699) in order to close (e.g., to turn on) or open (e.g., to turn off) the switch 566.

As discussed above and further emphasized here, FIG. 4(c) is merely an example, which should not unduly limit the scope of the claims. One of ordinary skill in the art would recognize many variations, alternatives, and modifications. For example, the switch 566 is an IGBT instead of a MOSFET.

Also, as discussed above and further emphasized here, FIGS. 3, 4(a), 4(b) and 4(c) are merely examples, which should not unduly limit the scope of the claims. One of ordinary skill in the art would recognize many variations, alternatives, and modifications. For example, a resistor is added to couple between the LEB component 350 and the comparator 346. In another example, a resistor is added to couple between the LEB component 550 and the comparator 546.

FIG. 5 is a simplified timing diagram for the power conversion system 500 according to an embodiment of the present invention. This diagram is merely an example, which should not unduly limit the scope of the claims. One of ordinary skill in the art would recognize many variations, alternatives, and modifications. As shown in FIG. 5, the waveform 802 represents the signal 699 (e.g., DRV) as a function of time, the waveform 804 represents the signal 680 (e.g., $V_{ramp}$) as a function of time, the waveform 806 represents the amplified signal 608 (e.g., $V_{ea}$) as a function of time, and the waveform 808 represents the feedback signal 604 as a function of time. Additionally, the waveform 810 represents the current sensing signal 610 (e.g., $V_{cs}$) as a function of time, the waveform 812 represents the threshold signal 616 (e.g., $V_{th\_max}$) as a function of time, and the waveform 814 represents the signal 612 (e.g., $V_{ctrl}$) as a function of time. For example, when the signal 699 (e.g., DRV) is at a logic high level (e.g., as shown by the waveform 802), the switch 566 is closed (e.g., being turned on). In another example, when the signal 699 (e.g., DRV) is at a logic low level (e.g., as shown by the waveform 802), the switch 566 is open (e.g., being turned off). In yet another example, the waveform 802 is substantially the same as the waveform of the signal 632.

As shown in FIG. 5, when the switch 566 is closed (e.g., being turned on), the transformer including the primary winding 560 and the secondary winding 562 stores energy, and the primary current 630 increases in magnitude (e.g., linearly), according to one embodiment. For example, the current sensing signal 610 increases in magnitude, and when the signal 610 reaches a limit (e.g., the signal 612 or the threshold signal 616), the switch 566 is caused to be open (e.g., being turned off). In yet another example, if the signal 612 (e.g., $V_{ctrl}$) is larger than the threshold signal 618 (e.g., $V_{th\_min}$) but smaller than the threshold signal 616 (e.g., $V_{th\_max}$) in magnitude, the peak magnitude of the current sensing signal 610 (e.g., $V_{cs}$ corresponding the waveform 810) is limited to the magnitude of the signal 612 (e.g., $V_{ctrl}$ corresponding to the waveform 814).

According to another embodiment, when the switch 566 is open, the transformer that includes the primary winding 560 and the secondary winding 562 outputs energy to the output terminal. For example, the demagnetization process begins (e.g., at time $t_1$), and the secondary current 694 that flows through the secondary winding 562 decreases in magnitude (e.g., linearly). The signal 680 (e.g., $V_{ramp}$ corresponding to the waveform 804) is restored to an initial value (e.g., $V_{refb}$), but after the demagnetization process is completed (e.g., at time $t_2$), the signal 680 decreases exponentially in one embodiment. For example, if the signal 680 becomes smaller than the amplified signal 608 (e.g., $V_{ea}$ corresponding to the waveform 806) in magnitude, the comparator 506 changes the comparison signal 628 in order to cause the switch 566 to be turned on. In another example, the signal 608 (e.g., $V_{ea}$) is larger in magnitude at heavy load conditions, and the duration of the off-time period associated with the switch 566 is shorter. In yet another example, the signal 608 (e.g., $V_{ea}$) is smaller in magnitude at light load conditions, and the duration of the off-time period associated with the switch 566 is longer which results in a lower switching frequency. Referring back to FIG. 2(a), the switching frequency has a lower limit (e.g., $f_{min}$) and an upper limit (e.g., $f_{max}$) in some embodiments. For example, at no load or light load conditions, the switching frequency is fixed at the lower limit (e.g., $f_{min}$).

FIG. 6 is a simplified diagram showing certain components of the power conversion system 500 including the voltage-mode component 504 according to an embodiment of the present invention. This diagram is merely an example, which should not unduly limit the scope of the claims. One of ordinary skill in the art would recognize many variations, alternatives, and modifications. The voltage-mode component 504 includes a current source 738, a capacitor 730, a transistor 732, comparators 704 and 706, and OR gates 734 and 745. For example, the transistor 732 is an N-channel field effect transistor. In another example, the signal generator 702 includes the current source 738, the capacitor 730 and the transistor 732. In yet another example, the LEB component 550 includes a resistor 752 and a transistor 756.

According to one embodiment, during the on-time period of a switching period associated with the switch 566, the transistor 732 is turned off in response to the signal 736, and the capacitor 730 is charged in response to the signal 626. For example, the signal 714 (e.g., $V_{ramp1}$) increases in magnitude linearly at a slope P. The slope P may be determined according to the following equation, as an example:

$$P = \frac{I\_vin}{C_2} \quad \text{(Equation 8)}$$

where I_vin represents the signal 626, and $C_2$ represents the capacitance of the capacitor 730. In another example, the signal 626 changes with the input line voltage and thus the slope P changes with the input line voltage.

According to another embodiment, the signal 714 is received by the comparators 704 and 706 which outputs signals 716 and 718 respectively. For example, the OR gate 734 receives the signals 716 and 718 and outputs a signal 747 to the OR gate 745. In another example, the OR gate 745 receives a control signal 782 (e.g., LEB_b) and outputs a signal 744 to the modulation component 538 in order to affect the duration of the on-time period associated with the switch 566. In yet another example, if the signal 712 (e.g., $V_{ctrl1}$) is larger than the threshold signal 720 (e.g., V_min) in magnitude, the duration of the on-time period is determined by the signal 712 (e.g., $V_{ctrl1}$). In yet another example, if the signal 712 (e.g., $V_{ctrl1}$) is smaller than the threshold signal 720 (e.g., V_min) in magnitude, the duration of the on-time period is determined by the signal 720 (e.g., V_min). In yet another example, during the off-time period of the switching period associated with the switch 566, the transistor 732 is turned on in response to the signal 736, and the capacitor 730 is discharged. In yet another example, the signal 714 (e.g., $V_{ramp1}$) decreases to a low magnitude (e.g., zero). In yet another example, the signal 744 is the same as the signal 644.

According to yet another embodiment, the LEB component 550 that includes the resistor 752 and the transistor 756 is affected by a control signal 780 (e.g., LEB), and outputs the current sensing signal 610 to the comparator 546. For example, the comparator 546 outputs a comparison signal 784 to an OR gate 750 which also receives the control signal 780 (e.g., LEB). In another example, the OR gate 750 outputs a signal 786 to the modulation component 538 in order to affect the status of the switch 566. In yet another example, if the control signal 780 is at the logic high level, the control signal 782 is at the logic low level, and if the control signal 780 is at the logic low level, the control signal 782 is at the logic high level. In yet another example, the control signal 780 (e.g., LEB) is an input signal of the LEB component 550. In yet another example, the control signal 780 (e.g., LEB) and the control signal 782 (e.g., LEB_b) are associated with a blanking time period during which the leading edge blanking is carried out. In yet another example, during the blanking time period, the control signal 780 (e.g., LEB) is at the logic high level and the control signal 782 (e.g., LEB_b) is at the logic low level. In yet another example, the modulation component 538 outputs the signal 646 to the logic component 540 which receives the signal 628 and outputs the signal 632 (e.g., DR1). The signal 632 (e.g., DR1) is used as shown in FIG. 4(a), FIG. 4(b) and FIG. 4(c) according to certain embodiments.

As discussed above, the slope P of the signal 626 affects the duration of the on-time period of a switching period. For example, the duration of the on-time period corresponds to the pulse width of the signal 699 (or the signal 499). In another example, the pulse width of the signal 699 (or the signal 499) increases if the slope P decreases, and the pulse width of the signal 699 (or the signal 499) decreases if the slope P increases. In yet another example, the pulse width of the signal 699 increases if the input voltage 642 decreases and if the output voltage 602 and the output current 694 remain constant. In yet another example, the pulse width of the signal 699 decreases if the input voltage 642 increases and if the output voltage 602 and the output current 694 remain constant.

As discussed above and further emphasized here, FIG. 6 is merely an example, which should not unduly limit the scope of the claims. One of ordinary skill in the art would recognize many variations, alternatives, and modifications. For example, the OR gate 734, the OR gate 745 and the OR gate 750 are included in the modulation component 538. In another example, the resistor 754 is removed so that the terminal 610 is directly coupled with the resistor 752 and the transistor 756.

FIG. 7(a) is a simplified timing diagram for the voltage-mode component 504 as part of the power conversion system 500 if the signal 712 is larger than the threshold signal 720 in magnitude according to an embodiment of the present invention, and FIG. 7(b) is a simplified timing diagram for the voltage-mode component 504 as part of the power conversion system 500 if the signal 712 is smaller than the threshold signal 720 in magnitude according to another embodiment of the present invention. These diagrams are merely examples, which should not unduly limit the scope of the claims. One of ordinary skill in the art would recognize many variations, alternatives, and modifications.

As shown in FIG. 7(a), the waveform 902 represents the signal 699 (e.g., DRV) as a function of time, the waveform 904 represents the signal 680 (e.g., $V_{ramp}$) as a function of time, and the waveform 906 represents the amplified signal 608 (e.g., $V_{ea}$) as a function of time. Additionally, the waveform 908 represents the signal 712 (e.g., $V_{ctrl1}$) as a function of time, the waveform 910 represents the signal 714 (e.g., $V_{ramp1}$) as a function of time, and the waveform 912 represents the threshold signal 720 (e.g., V_min) as a function of time. For example, when the signal 699 (e.g., DRV) is at a logic high level (e.g., as shown by the waveform 902), the switch 566 is closed (e.g., being turned on). In another example, when the signal 699 (e.g., DRV) is at a logic low level (e.g., as shown by the waveform 902), the switch 566 is open (e.g., being turned off). In yet another example, the waveform 902 is substantially the same as the waveform of the signal 632.

When the switch 566 is closed (e.g., being turned on), the transformer including the primary winding 560 and the secondary winding 562 stores energy, and the primary current 630 increases in magnitude (e.g., linearly), according to one embodiment. For example, the transistor 732 is turned off in response to the signal 736, and the capacitor 730 is charged in response to the signal 626. In another example, the signal 714 (e.g., $V_{ramp1}$) increases in magnitude (e.g., linearly) as shown by the waveform 910. Because the signal 712 (e.g., $V_{ctrl1}$) is larger than the threshold signal 720 (e.g., V_min) in magnitude, when the signal 714 becomes approximately equal to the signal 712 (e.g., $V_{ctrl1}$) in magnitude, the comparator 706 changes the signal 718 in order to cause the switch 566 to be opened (e.g., to be turned off), in some embodiments. For example, the duration of the on-time period increases with the magnitude of the signal 712 (e.g., $V_{ctrl1}$).

When the switch 566 is open (e.g., being turned off), the transformer that includes the primary winding 560 and the secondary winding 562 outputs energy to the output terminal according to another embodiment. For example, the demagnetization process begins (e.g., at time $t_4$), and the secondary current 694 that flows through the secondary winding 562 decreases in magnitude (e.g., linearly). In another example, the signal 680 (e.g., $V_{ramp}$ corresponding to the waveform 904) is restored to an initial value (e.g., $V_{refb}$), but after the demagnetization process is completed (e.g., at time $t_5$), the signal 680 decreases exponentially as shown by the waveform 904. In yet another example, when the switch 566 is open (e.g., at $t_4$), the transistor 732 is turned on in response to the signal 736, and the capacitor 730 is discharged. In yet another example, the signal 714 (e.g., $V_{ramp1}$) decreases to a low magnitude (e.g., zero) as shown by the waveform 910.

As shown in FIG. 7(b), the waveform 1002 represents the signal 699 (e.g., DRV) as a function of time, the waveform 1004 represents the signal 680 (e.g., $V_{ramp}$) as a function of time, and the waveform 1006 represents the amplified signal 608 (e.g., $V_{ea}$) as a function of time. Additionally, the waveform 1008 represents the signal 712 (e.g., $V_{ctrl1}$) as a function of time, the waveform 1010 represents the signal 714 (e.g., $V_{ramp1}$) as a function of time, and the waveform 1012 represents the threshold signal 720 (e.g., V_min) as a function of time. For example, when the signal 699 (e.g., DRV) is at a logic high level (e.g., as shown by the waveform 1002), the switch 566 is closed (e.g., being turned on). In another example, when the signal 699 (e.g., DRV) is at a logic low level (e.g., as shown by the waveform 1002), the switch 566 is open (e.g., being turned off). In yet another example, the waveform 1002 is substantially the same as the waveform of the signal 632.

When the switch 566 is closed (e.g., being turned on), the transformer including the primary winding 560 and the secondary winding 562 stores energy, and the primary current 630 increases in magnitude (e.g., linearly), according to one embodiment. For example, the transistor 732 is turned off in response to the signal 736, and the capacitor 730 is charged in response to the signal 626. In another example, the signal 714 (e.g., $V_{ramp1}$) increases in magnitude (e.g., linearly) as shown by the waveform 1010. Because the signal 712 (e.g., $V_{ctrl1}$) is smaller than the threshold signal 720 (e.g., V_min) in magnitude, when the signal 714 becomes approximately equal to the signal 720 (e.g., V_min) in magnitude, the comparator 704 changes the signal 716 in order to cause the switch 566 to be opened (e.g., to be turned off), in some embodiments. For example, the duration of the on-time period increases with the magnitude of the signal 720 (e.g., V_min).

When the switch 566 is open (e.g., being turned off), the transformer that includes the primary winding 560 and the secondary winding 562 outputs energy to the output terminal according to another embodiment. For example, the demagnetization process begins (e.g., at time $t_8$), and the secondary current 694 that flows through the secondary winding 562 decreases in magnitude (e.g., linearly). In another example, the signal 680 (e.g., $V_{ramp}$ corresponding to the waveform 1004) is restored to an initial value (e.g., $V_{refb}$), but after the demagnetization process is completed (e.g., at time $t_9$), the signal 680 decreases exponentially as shown by the waveform 1004. In yet another example, when the switch 566 is open (e.g., at $t_8$), the transistor 732 is turned on in response to the signal 736, and the capacitor 730 is discharged. In yet another example, the signal 714 (e.g., $V_{ramp1}$) decreases to a low magnitude (e.g., zero) as shown by the waveform 1010.

As discussed above and further emphasized here, FIGS. 3 and 6 are merely examples, which should not unduly limit the scope of the claims. One of ordinary skill in the art would recognize many variations, alternatives, and modifications. For example, the power conversion system 300 includes all the components as shown in FIG. 6. In another example, the voltage-mode component 304 operates in the same manner as the voltage-mode component 504 as shown in FIGS. 7(a) and (b). In one embodiment, the voltage-mode component 304 includes the OR gate 734, and outputs the signal 444 based on at least information associated with the signals 712 and 720 without directly comparing the signals 712 and 720. In another embodiment, the voltage-mode component 304 is configured to, without directly comparing the signals 712 and 720, if the signal 712 (e.g., $V_{ctrl1}$) is larger than the signal 720 (e.g., V_min) in magnitude and the signal 714 (e.g., $V_{ramp1}$) is smaller than the signal 712 (e.g., $V_{ctrl1}$), generate the signal 444 in order to close the switch, and if the signal 712 (e.g., $V_{ctrl1}$) is smaller than the signal 720 (e.g., V_min) in magnitude and the signal 714 (e.g., $V_{ramp1}$) is smaller than the signal 720 (e.g., V_min), generate the signal 444 in order to close the switch.

According to another embodiment, a system controller for regulating an output of a power conversion system includes a signal generator and a modulation and drive component. The signal generator is configured to receive at least a first signal indicating a magnitude of an input voltage received by a primary winding of a power conversion system and receive a second signal indicating a magnitude of a primary current flowing through the primary winding, and generate a third signal. The modulation and drive component is configured to receive at least the third signal, generate a drive signal based on at least information associated with the third signal, and output the drive signal to a switch to affect the primary current. The signal generator and the modulation and drive component are further configured to, if an output voltage of the power conversion system is constant and an output current of the power conversion system falls within a first predetermined range, generate a modulation signal as the drive signal based on at least information associated with the magnitude of the input voltage without taking into account the magnitude of the primary current flowing through the primary winding, and if the output voltage is constant and the output current falls within a second predetermined range, generate the modulation signal as the drive signal based on at least information associated with the magnitude of the primary current without taking into account the magnitude of the input voltage. For example, the system controller is implemented according to at least FIG. 2(a), FIG. 2(b), FIG. 3, FIG. 4(a), FIG. 4(b), and/or FIG. 4(c).

According to yet another embodiment, a system controller for regulating an output of a power conversion system includes a signal generator and a modulation and drive component. The signal generator is configured to receive at least a first signal indicating a magnitude of an input voltage received by a primary winding of a power conversion system, process information associated with the first signal, and generate a second signal based on at least information associated with the first signal. The modulation and drive component is configured to receive at least the second signal, generate a drive signal based on at least information associated with the second signal, and output the drive signal to a switch to affect a primary current flowing through the primary winding. The signal generator and the modulation and drive component are further configured to, if an output voltage of the power conversion system is constant and an output current of the power conversion system falls within a first predetermined range, generate a pulse-width-modulation signal corresponding to a pulse width and a modulation frequency as the drive signal. The pulse width decreases if the input voltage increases and if the output voltage and the output current remain constant. For example, the system controller is implemented according to at least FIG. 2(a), FIG. 2(b), FIG. 3, FIG. 4(a), FIG. 4(b), and/or FIG. 4(c).

According to yet another embodiment, a system controller for regulating an output of a power conversion system includes a signal generator, a first comparator, a second comparator, and a modulation and drive component. The signal generator is configured to receive at least a first signal indicating a magnitude of an input voltage received by a primary winding of a power conversion system, process information associated with the first signal, and generate a second signal based on at least information associated with the first signal. The first comparator is configured to receive the second signal and a third signal associated with a feedback signal of the power conversion system and generate a first comparison signal based on at least information associated with the second signal and the third signal. The second comparator is configured to receive the second signal and a threshold signal and generate a second comparison signal based on at least information associated with the second signal and the threshold signal. The modulation and drive component is configured to receive at least the first comparison signal and the second comparison signal, generate a drive signal based on at least information associated with the first comparison signal and the second comparison signal, and output the drive signal to a switch to affect a primary current flowing through the primary winding. The modulation and drive component is further configured to, if the third signal is larger than the threshold signal in magnitude, output the drive signal to close the switch if the second signal is smaller than the third signal, and if the threshold signal is larger than the third signal in magnitude, output the drive signal to close the switch if the second signal is smaller than the threshold signal. For example, the system controller is implemented according to at least FIG. 4(a), FIG. 4(b), FIG. 4(c), FIG. 5, FIG. 6, FIG. 7(a) and/or FIG. 7(b).

In one embodiment, a method for regulating an output of a power conversion system includes receiving at least a first signal indicating a magnitude of an input voltage received by a primary winding of a power conversion system, receiving a second signal indicating a magnitude of a primary current flowing through the primary winding, and processing information associated with the first signal and the second signal. The method further includes generating a third signal, receiving at least the third signal, and processing information associated with the third signal. In addition, the method includes generating a drive signal based on at least information associated with the third signal, and outputting the drive signal to a switch to affect the primary current. The process for generating a drive signal based on at least information associated with the third signal includes, if an output voltage of the power conversion system is constant and an output current of the power conversion system falls within a first predetermined range, generating a modulation signal as the drive signal based on at least information associated with the magnitude of the input voltage without taking into account the magnitude of the primary current flowing through the primary winding, and if the output voltage is constant and the output current falls within a second predetermined range, generating the modulation signal as the drive signal based on at least information associated with the magnitude of the primary current without taking into account the magnitude of the input voltage. For example, the method is implemented according to at least FIG. 2(a), FIG. 2(b), FIG. 3, FIG. 4(a), FIG. 4(b), and/or FIG. 4(c).

In another embodiment, a method for regulating an output of a power conversion system includes receiving at least a first signal indicating a magnitude of an input voltage received by a primary winding of a power conversion system, processing information associated with the first signal, and generating a second signal based on at least information associated with the first signal. The method further includes receiving at least the second signal, processing information associated with the second signal, generating a drive signal based on at least information associated with the second signal, and outputting the drive signal to a switch to affect a primary current flowing through the primary winding. The process for generating a drive signal based on at least information associated with the second signal includes, if an output voltage of the power conversion system is constant and an output current of the power conversion system falls within a first predetermined range, generating a pulse-width-modulation signal corresponding to a pulse width and a modulation frequency as the drive signal. The pulse width decreases if the input voltage increases and if the output voltage and the output current remain constant. For example, the method is implemented according to at least FIG. 2(a), FIG. 2(b), FIG. 3, FIG. 4(a), FIG. 4(b), and/or FIG. 4(c).

In yet another embodiment, a method for regulating an output of a power conversion system includes receiving at least a first signal indicating a magnitude of an input voltage received by a primary winding of a power conversion system, processing information associated with the first signal, and generating a second signal based on at least information associated with the first signal. The method further includes receiving the second signal and a third signal associated with a feedback signal of the power conversion system, processing information associated with the second signal and the third signal, and generating a first comparison signal based on at least information associated with the second signal and the third signal. In addition, the method includes receiving the second signal and a threshold signal, processing information associated with the second signal and the threshold signal, and generating a second comparison signal based on at least information associated with the second signal and the threshold signal. Moreover, the method includes receiving at least the first comparison signal and the second comparison signal, processing information associated with the first comparison signal and the second comparison signal, generating a drive signal based on at least information associated with the first comparison signal and the second comparison signal, and outputting the drive signal to a switch to affect a primary current flowing through the primary winding. The process for outputting the drive signal to a switch to affect a primary current flowing through the primary winding includes, if the third signal is larger than the threshold signal in magnitude, outputting the drive signal to close the switch if the second signal is smaller than the third signal, and if the threshold signal is larger than the third signal in magnitude, outputting the drive signal to close the switch if the second signal is smaller than the threshold signal. For example, the method is implemented according to at least FIG. 4(a), FIG. 4(b), FIG. 4(c), FIG. 5, FIG. 6, FIG. 7(a) and/or FIG. 7(b).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
   a modulation and drive signal generator configured to:
      generate a drive signal based at least in part on a signal selected from a group consisting of a first signal and a second signal, the first signal indicating a magnitude of an input voltage, the second signal indicating a magnitude of a current flowing through a primary winding of a power converter; and
      output the drive signal to a switch to affect the current;
   wherein the modulation and drive signal generator is further configured to, in response to an output voltage of the power converter being regulated in a constant-voltage mode,
      in response to an output current of the power converter falling within a first predetermined range, generate, without taking into account the magnitude of the current flowing through the primary winding, a modulation signal based at least in part on the magnitude of the input voltage, the modulation signal being the drive signal; and
      in response to the output current falling within a second predetermined range, generate, without taking into account the magnitude of the input voltage, the modulation signal based at least in part on the magnitude of the current, the modulation signal being the drive signal.

2. The system of claim 1 wherein the modulation and drive signal generator is further configured to:
   in response to the output current being larger than a first threshold and smaller than a second threshold in magnitude, determine that the output current of the power converter falls within the first predetermined range; and
   in response to the output current being larger than the second threshold and smaller than a third threshold in magnitude, determine that the output current falls within the second predetermined range.

3. The system of claim 2 wherein:
   the modulation signal corresponds to a modulation frequency; and
   the modulation and drive signal generator is further configured to, in response to the output current being larger than the first threshold and smaller than the second threshold in magnitude, keep the modulation frequency at a predetermined frequency value in response to the output current increasing and in response to the output voltage and the input voltage remaining constant.

4. The system of claim 3 wherein the modulation and drive signal generator is further configured to, in response to the output current being larger than the first threshold and smaller than the second threshold in magnitude, output the modulation signal to the switch so that a peak value of the current increases in response to the output current increasing and in response to the output voltage and the input voltage remaining constant.

5. The system of claim 4 wherein the modulation and drive signal generator is further configured to, in response to the output current being larger than the second threshold and smaller than a fourth threshold in magnitude, increase the modulation frequency in response to the output current increasing and in response to the output voltage and the input voltage remaining constant, the fourth threshold being smaller than the third threshold in magnitude.

6. The system of claim 5 wherein the modulation and drive signal generator is further configured to, in response to the output current being larger than the second threshold and smaller than the fourth threshold in magnitude, output the modulation signal to the switch so that the peak value of the current does not change in response to the output current increasing and in response to the output voltage and the input voltage remaining constant.

7. The system of claim 6 wherein the modulation and drive signal generator is further configured to, in response to the output current being larger than the fourth threshold and smaller than a fifth threshold in magnitude, increase the modulation frequency in response to the output current increasing and in response to the output voltage and the input voltage remaining constant, the fifth threshold being smaller than the third threshold in magnitude.

8. The system of claim 7 wherein the modulation and drive signal generator is further configured to, in response to the output current being larger than the fourth threshold and smaller than the fifth threshold in magnitude, output the modulation signal to the switch so that the peak value of the current increases in response to the output current increasing and in response to the output voltage and the input voltage remaining constant.

9. The system of claim 8 wherein the modulation and drive signal generator is further configured to, in response to the output current being larger than the fifth threshold and smaller than the third threshold in magnitude, increase the modulation frequency in response to the output current increasing and in response to the output voltage and the input voltage remaining constant.

10. The system of claim 9 wherein the modulation and drive signal generator is further configured to, in response to the output current being larger than the fifth threshold and smaller than the third threshold in magnitude, output the modulation signal to the switch so that the peak value of the current does not change in response to the output current increasing and in response to the output voltage and the input voltage remaining constant.

11. The system of claim 1 wherein the modulation and drive signal generator includes:
 a modulation signal generator configured to generate a fourth signal based at least in part on a third signal, the third signal being associated with the first signal and the second signal; and
 a drive signal generator configured to receive the fourth signal and generate the drive signal based at least in part on the fourth signal.

12. The system of claim 1, and further comprising:
 an error amplifier configured to receive a feedback signal of the power converter and generate an amplified signal based at least in part on the feedback signal; and
 a signal generator configured to receive the amplified signal and generate a voltage signal to the modulation and drive signal generator based on at least information associated with the amplified signal.

13. The system of claim 1 wherein the modulation and drive signal generator includes:
 a first signal generator configured to generate a third signal based at least in part on the first signal;
 a first comparator configured to receive the third signal and a fourth signal associated with a feedback signal of the power converter and generate a first comparison signal based at least in part on the third signal and the fourth signal; and
 a second comparator configured to receive the third signal and a threshold signal and generate a second comparison signal based at least in part on the third signal and the threshold signal.

14. The system of claim 13 wherein the modulation and drive signal generator further includes a second signal generator configured to receive the first comparison signal and the second comparison signal and generate a fifth signal based at least in part on the first comparison signal and the second comparison signal, the drive signal being associated with the fifth signal.

15. The system of claim 13 wherein the third signal is a ramp signal, the ramp signal including a signal pulse for each switching period associated with the drive signal.

16. The system of claim 1 wherein the modulation and drive signal generator is further configured to output the drive signal to a bipolar junction transistor, the bipolar junction transistor being the switch.

17. The system of claim 1 wherein the modulation and drive signal generator is further configured to output the drive signal to a metal-oxide-semiconductor field-effect transistor, the metal-oxide-semiconductor field-effect transistor being the switch.

18. The system of claim 1 wherein the modulation and drive signal generator is further configured to output the drive signal to an insulated-gate bipolar transistor, the insulated-gate bipolar transistor being the switch.

19. A system for regulating a power converter, the system comprising:
 a modulation and drive signal generator configured to:
  generate a drive signal based at least in part on a first signal, the first signal indicating a magnitude of an input voltage received by a primary winding of a power converter; and
  output the drive signal to a switch to affect a current flowing through the primary winding;
 wherein the modulation and drive signal generator is further configured to:
  in response to an output voltage of the power converter being regulated in a constant-voltage mode and in response to an output current of the power converter falling within a first predetermined range, generate a pulse-width-modulation signal, the pulse-width-modulation signal being the drive signal, the pulse-width-modulation signal corresponding to a pulse width and a modulation frequency; and
  decrease the pulse width in response to the input voltage increasing and in response to the output voltage and the output current remaining constant.

20. The system of claim 19 wherein the modulation and drive signal generator is further configured to, in response to the output voltage of the power converter being regulated in the constant-voltage mode and the output current of the power converter falling within the first predetermined range, generate the pulse-width-modulation signal, the pulse-width-modulation signal being the drive signal, so that a peak value of the current increases in response to the output current increasing and in response to the output voltage and the input voltage remaining constant.

21. The system of claim 20 wherein the modulation and drive signal generator is further configured to, in response to the output voltage of the power converter being regulated in the constant-voltage mode and the output current of the power converter falling within the first predetermined range, generate the pulse-width-modulation signal, the pulse-width-modulation signal being the drive signal, so that the peak value of the current increases linearly in response to the output current increasing and in response to the output voltage and the input voltage remaining constant.

22. The system of claim 20 wherein the modulation frequency is constant with respect to the output current.

23. The system of claim 20 wherein the first signal is proportional to the input voltage in magnitude.

24. The system of claim 20 wherein the modulation and drive signal generator is further configured to, in response to the output current being larger than a first threshold and smaller than a second threshold in magnitude, determine that the output current of the power converter falls within the first predetermined range.

25. The system of claim 19 wherein the modulation and drive signal generator is further configured to, in response to the output voltage of the power converter being regulated in the constant-voltage mode and in response to the output current of the power converter falling within the first predetermined range, generate, without taking into account the magnitude of the current flowing through the primary winding, the pulse-width-modulation signal based at least in part on the magnitude of the input voltage, the pulse-width-modulation signal being the drive signal.

26. The system of claim 25 wherein the modulation and drive signal generator is further configured to, in response to the output voltage being regulated in the constant-voltage mode and in response to the output current falling within a second predetermined range, generate, without taking into account the magnitude of the input voltage, the pulse-widthmodulation signal based at least in part on the magnitude of the current, the pulse-width-modulation signal being the drive signal.

27. The system of claim 26 wherein the modulation and drive signal generator is further configured to, in response to the output current being larger than a second threshold and smaller than a third threshold in magnitude, determine that the output current of the power converter falls within the second predetermined range.

28. The system of claim 19 wherein the modulation and drive signal generator includes:
   a first signal generator configured to generate a second signal based at least in part on the first signal;
   a first comparator configured to receive the second signal and a third signal associated with a feedback signal of the power converter and generate a first comparison signal based at least in part on the second signal and the third signal; and
   a second comparator configured to receive the second signal and a threshold signal and generate a second comparison signal based at least in part on the second signal and the threshold signal.

29. The system of claim 28 wherein the modulation and drive signal generator further includes a second signal generator configured to receive the first comparison signal and the second comparison signal and generate a fourth signal based at least in part on the first comparison signal and the second comparison signal.

30. The system of claim 28 wherein the second signal is a ramp signal, the ramp signal including a signal pulse for each switching period associated with the drive signal.

31. The system of claim 19 wherein the modulation and drive signal generator is further configured to output the drive signal to a bipolar junction transistor, the bipolar junction transistor being the switch.

32. The system of claim 19 wherein the modulation and drive signal generator is further configured to output the drive signal to a metal-oxide-semiconductor field-effect transistor, the metal-oxide-semiconductor field-effect transistor being the switch.

33. The system of claim 19 wherein the modulation and drive signal generator is further configured to output the drive signal to an insulated-gate bipolar transistor, insulated-gate bipolar transistor being the switch.

34. A system for regulating a power converter, the system comprising:
   a first comparator configured to receive a first signal and a second signal associated with a feedback signal of a power converter and generate a first comparison signal based at least in part on the first signal and the second signal, the first signal indicating a magnitude of an input voltage;
   a second comparator configured to receive the first signal and a threshold signal and generate a second comparison signal based at least in part on the first signal and the threshold signal; and
   a drive signal generator configured to receive the first comparison signal and the second comparison signal, generate a drive signal based at least in part on a signal selected from a group consisting of the first comparison signal and the second comparison signal, and output the drive signal to a first switch to affect a current flowing through a primary winding of the power converter;
   wherein the drive signal generator is further configured to:
      in response to the second signal being larger than the threshold signal in magnitude, output the drive signal to close the first switch in response to the first signal being smaller than the second signal; and
      in response to the threshold signal being larger than the second signal in magnitude, output the drive signal to close the first switch in response to the first signal being smaller than the threshold signal.

35. The system of claim 34 wherein the first signal is a ramp signal, the ramp signal including a signal pulse for each switching period associated with the drive signal.

36. The system of claim 34 wherein the first comparator is further configured to receive the second signal associated with an amplified signal generated by an error amplifier based at least in part on the feedback signal of the power converter.

37. The system of claim 34 wherein:
   the drive signal generator includes an OR gate configured to receive the first comparison signal and the second comparison signal and generate a logic signal; and
   the drive signal generator is further configured to generate the drive signal based at least in part on the logic signal.

38. The system of claim 34 wherein the drive signal generator includes:
   a first signal generator configured to receive the first comparison signal and the second comparison signal and generate a first processed signal based at least in part on the first comparison signal and the second comparison signal;
   a modulation signal generator configured to receive the first processed signal and generate a modulation signal based at least in part on the first processed signal; and
   a driver configured to receive the modulation signal and generate the drive signal.

39. The system of claim 38 wherein the first signal generator includes:
   a first OR gate configured to receive the first comparison signal and the second comparison signal and generate a second processed signal based at least in part on the first comparison signal and the second comparison signal; and
   a second OR gate configured to receive the second processed signal and a first control signal associated with a signal period and generate the first processed signal based at least in part on the second processed signal and the first control signal.

40. The system of claim 39, and further comprising:
   a second signal generator configured to receive a second control signal associated with the signal period and a current sensing signal associated with the current flowing through the primary winding of the power converter and generate a third processed signal based at least in part on the second control signal and the current sensing signal; and
   a third comparator configured to receive the second signal associated with the feedback signal of the power converter and the third processed signal and generate a third comparison signal based at least in part on the second signal and the third processed signal.

41. The system of claim 40, and further comprising a third OR gate configured to receive the third comparison signal and the second control signal and output a fourth processed signal to the drive signal generator.

42. The system of claim 41 wherein during the signal period, the first control signal is at a logic high level and the second control signal is at a logic low level.

43. The system of claim 41 wherein during the signal period, the first control signal is at a logic low level and the second control signal is at a logic high level.

44. The system of claim 34, and further comprising:
a capacitor configured to receive a third signal and generate the first signal; and
a second switch configured to be closed or open in response to a switching signal;
wherein:
in response to the second switch being open, the capacitor is configured to be charged by the third signal; and
in response to the second switch being closed, the capacitor is configured to be discharged through the second switch.

45. The system of claim 34 wherein the drive signal generator is further configured to output the drive signal to a bipolar junction transistor, the bipolar junction transistor being the first switch.

46. The system of claim 34 wherein the drive signal generator is further configured to output the drive signal to a metal-oxide-semiconductor field-effect transistor, the metal-oxide-semiconductor field-effect transistor being the first switch.

47. The system of claim 34 wherein the drive signal generator is further configured to output the drive signal to an insulated-gate bipolar transistor, the insulated-gate bipolar transistor being the first switch.

48. A method for regulating a power converter, the method comprising:
receiving a first signal indicating a magnitude of an input voltage;
receiving a second signal indicating a magnitude of a current flowing through a primary winding of a power converter;
generating a drive signal based at least in part on a signal selected from a group consisting of the first signal and the second signal; and
outputting the drive signal to affect the current;
wherein the generating a drive signal based at least in part on the first signal and the second signal includes: in response to an output voltage of the power converter being regulated in a constant-voltage mode,
in response to an output current of the power converter falling within a first predetermined range, generating, without taking into account the magnitude of the current, a modulation signal based at least in part on the magnitude of the input voltage, the modulation signal being the drive signal; and
in response to the output current falling within a second predetermined range, generating, without taking into account the magnitude of the input voltage, the modulation signal based at least in part on the magnitude of the current, the modulation signal being the drive signal.

49. The method of claim 48, and further comprising:
in response to the output current being larger than a first threshold and smaller than a second threshold in magnitude, determining that the output current of the power converter falls within the first predetermined range; and
in response to the output current being larger than the second threshold and smaller than a third threshold in magnitude, determining that the output current falls within the second predetermined range.

50. The method of claim 49, and further comprising:
in response to the output current being larger than the first threshold and smaller than the second threshold in magnitude, keeping a modulation frequency at a predetermined frequency value in response to the output current increasing and in response to the output voltage and the input voltage remaining constant, the modulation signal corresponding to the modulation frequency.

51. The method of claim 50, and further comprising:
in response to the output current being larger than the first threshold and smaller than the second threshold in magnitude, outputting the modulation signal to a switch so that a peak value of the current increases in response to the output current increasing and in response to the output voltage and the input voltage remaining constant.

52. The method of claim 51, and further comprising:
in response to the output current being larger than the second threshold and smaller than a fourth threshold in magnitude, increasing the modulation frequency in response to the output current increasing and in response to the output voltage and the input voltage remaining constant, the fourth threshold being smaller than the third threshold in magnitude.

53. The method of claim 52, and further comprising:
in response to the output current being larger than the second threshold and smaller than the fourth threshold in magnitude, outputting the modulation signal to the switch so that the peak value of the current does not change in response to the output current increasing and in response to the output voltage and the input voltage remaining constant.

54. The method of claim 53, and further comprising:
in response to the output current being larger than the fourth threshold and smaller than a fifth threshold in magnitude, increasing the modulation frequency in response to the output current increasing and in response to the output voltage and the input voltage remaining constant, the fifth threshold being smaller than the third threshold in magnitude.

55. The method of claim 54, and further comprising:
in response to the output current being larger than the fourth threshold and smaller than the fifth threshold in magnitude, outputting the modulation signal to the switch so that the peak value of the current increases in response to the output current increasing and in response to the output voltage and the input voltage remaining constant.

56. The method of claim 55, and further comprising:
in response to the output current being larger than the fifth threshold and smaller than the third threshold in magnitude, increasing the modulation frequency in response to the output current increasing and in response to the output voltage and the input voltage remaining constant.

57. The method of claim 56, and further comprising:
in response to the output current being larger than the fifth threshold and smaller than the third threshold in magnitude, outputting the modulation signal to the switch so that the peak value of the current does not change in response to the output current increasing and in response to the output voltage and the input voltage remaining constant.

58. A method for regulating a power converter, the method comprising:
receiving a first signal indicating a magnitude of an input voltage;
generating a drive signal based at least in part on the first signal; and
outputting the drive signal to affect a current flowing through a primary winding of a power converter;
wherein the generating a drive signal based at least in part on the first signal includes:

in response to an output voltage of the power converter being regulated in a constant-voltage mode and in response to an output current of the power converter falling within a first predetermined range, generating a pulse-width-modulation signal, the pulse-width-modulation signal being the drive signal, the pulse-width-modulation signal corresponding to a pulse width and a modulation frequency; and decreasing the pulse width in response to the input voltage increasing and in response to the output voltage and the output current remaining constant.

59. The method of claim 58, and further comprising:
in response to the output voltage of the power converter being regulated in the constant-voltage mode and the output current of the power converter falling within the first predetermined range, generating the pulse-width-modulation signal, the pulse-width-modulation signal being the drive signal, so that a peak value of the current increases in response to the output current increasing and in response to the output voltage and the input voltage remaining constant.

60. The method of claim 59, and further comprising:
in response to the output voltage of the power converter being regulated in the constant-voltage mode and the output current of the power converter falling within the first predetermined range, generating the pulse-width-modulation signal, the pulse-width-modulation signal being the drive signal, so that the peak value of the current increases linearly in response to the output current increasing and in response to the output voltage and the input voltage remaining constant.

61. The method of claim 58, and further comprising:
in response to the output voltage of the power converter being regulated in the constant-voltage mode and in response to the output current of the power converter falling within the first predetermined range, generating, without taking into account the magnitude of the current flowing through the primary winding, the pulse-width-modulation signal based at least in part on the magnitude of the input voltage, the pulse-width-modulation signal being the drive signal.

62. The method of claim 61, and further comprising:
in response to the output voltage being regulated in the constant-voltage mode and in response to the output current falling within a second predetermined range, generating, without taking into account the magnitude of the input voltage, the pulse-width-modulation signal based at least in part on the magnitude of the current, the pulse-width-modulation signal being the drive signal.

63. A method for regulating a power converter, the method comprising:
generating a first comparison signal based at least in part on a first signal and a second signal, the first signal indicating a magnitude of an input voltage, the second signal being associated with a feedback signal of a power converter;
generating a second comparison signal based at least in part on the first signal and a threshold signal;
generating a drive signal based at least in part on a signal selected from a group consisting of the first comparison signal and the second comparison signal; and
outputting the drive signal to affect a current flowing through a primary winding of the power converter;
wherein the outputting the drive signal to affect a current flowing through a primary winding of the power converter includes:
in response to the second signal being larger than the threshold signal in magnitude, outputting the drive signal to close a switch in response to the first signal being smaller than the second signal; and
in response to the threshold signal being larger than the second signal in magnitude, outputting the drive signal to close the switch in response to the first signal being smaller than the threshold signal.

* * * * *